United States Patent
Sakaguchi

(10) Patent No.: US 10,688,386 B2
(45) Date of Patent: Jun. 23, 2020

(54) INFORMATION PROCESSING SYSTEM, STORAGE MEDIUM HAVING STORED THEREIN INFORMATION PROCESSING PROGRAM, INFORMATION PROCESSING METHOD, AND INFORMATION PROCESSING APPARATUS

(71) Applicant: NINTENDO CO., LTD., Kyoto (JP)

(72) Inventor: Tsubasa Sakaguchi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 158 days.

(21) Appl. No.: 16/054,158

(22) Filed: Aug. 3, 2018

(65) Prior Publication Data

US 2019/0217185 A1 Jul. 18, 2019

(30) Foreign Application Priority Data

Jan. 17, 2018 (JP) .................... 2018-005365

(51) Int. Cl.
*A63F 13/211* (2014.01)
*A63F 13/212* (2014.01)
(Continued)

(52) U.S. Cl.
CPC .......... *A63F 13/211* (2014.09); *A63F 13/212* (2014.09); *A63F 13/213* (2014.09);
(Continued)

(58) Field of Classification Search
None
See application file for complete search history.

(56) References Cited

U.S. PATENT DOCUMENTS

2006/0239471 A1* 10/2006 Mao ................. H04R 1/406
381/92
2006/0252541 A1* 11/2006 Zalewski ............. A63F 13/02
463/36

(Continued)

FOREIGN PATENT DOCUMENTS

EP       3 103 529 A2    12/2016
JP       2010-17387       1/2010

OTHER PUBLICATIONS

Anonymous, "PlayStation Move—Wikipedia, the free encyclopedia", Jun. 27, 2010, XP055125047, http://en.wikipedia.org/w/index.php?title=PlayStation Move&oldid=370488813, retrieved on Jun. 24, 2014 (13 pgs.).

(Continued)

*Primary Examiner* — Mazda Sabouri
(74) *Attorney, Agent, or Firm* — Nixon & Vanderhye, P.C.

(57) ABSTRACT

A detection target portion of a device is captured by an image capturing unit. An operation unit of the device is operated by a user and causes the detection target portion to move in conjunction with the operation unit in accordance with the operation. A detection target portion image representing the detection target portion comprised in a captured image captured by the image capturing unit is detected, and at least one of a position and a shape of the detection target portion image in the captured image is specified. Then, based on the at least one of the position and the shape of the detection target portion image, it is determined whether or not a condition for performing a first process that is information processing is satisfied. Then, based on data output from an inertial sensor, the condition is changed.

20 Claims, 24 Drawing Sheets

(51) Int. Cl.
*A63F 13/213* (2014.01)
*A63F 13/42* (2014.01)
*A63F 13/245* (2014.01)
*A63F 13/214* (2014.01)
*A63F 13/22* (2014.01)
*A63F 13/24* (2014.01)
*G06T 7/70* (2017.01)

(52) U.S. Cl.
CPC ............ *A63F 13/214* (2014.09); *A63F 13/22* (2014.09); *A63F 13/24* (2014.09); *A63F 13/245* (2014.09); *A63F 13/42* (2014.09); *G06T 7/70* (2017.01)

(56) References Cited

U.S. PATENT DOCUMENTS

| | | |
|---|---|---|
| 2010/0007528 A1 | 1/2010 | Urata et al. |
| 2010/0164862 A1* | 7/2010 | Sullivan ............... G06K 9/3216 345/156 |
| 2012/0194517 A1* | 8/2012 | Izadi ...................... G06T 17/00 345/420 |
| 2012/0302349 A1* | 11/2012 | Marks .................... G06F 3/017 463/38 |
| 2015/0258432 A1* | 9/2015 | Stafford ................ A63F 13/213 463/32 |
| 2016/0214015 A1* | 7/2016 | Osman .................. A63F 13/213 |

OTHER PUBLICATIONS

Wikipedia, "DualShock", Apr. 11, 2013, XP055333563, https://en.wikipedia.org/w/index.php?title=DualShock&oldID=549872014, retrieved on Jan. 10, 2017 (7 pgs.).

European Search Report dated Sep. 26, 2018 issued in European Application No. 18187038.7 (4 pgs.).

\* cited by examiner

FIG. 8
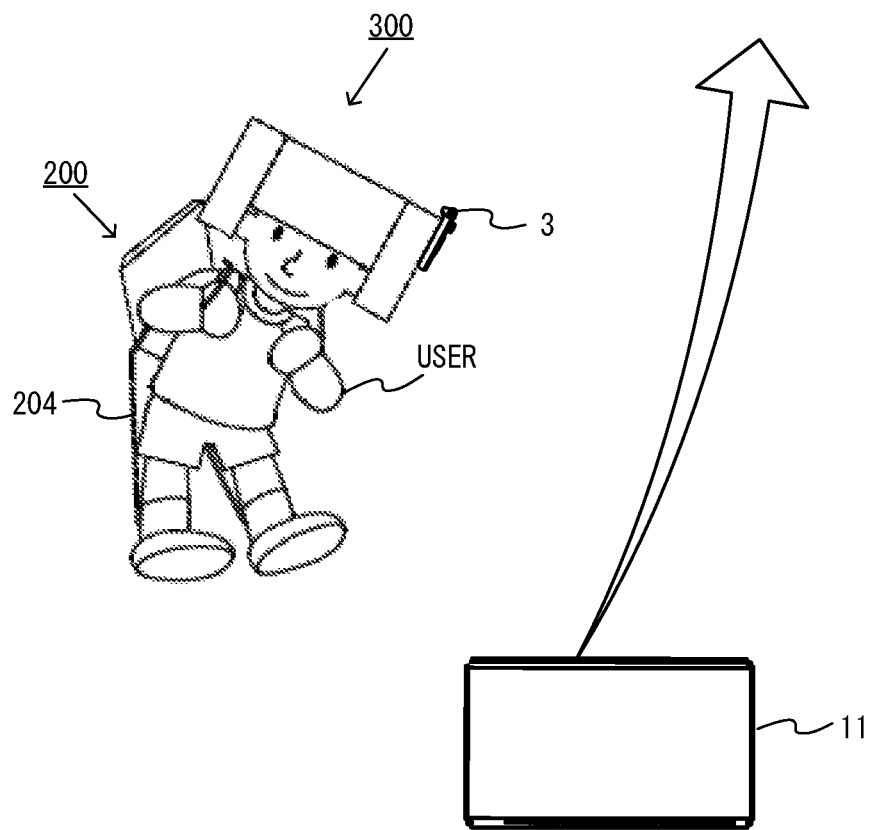

F I G. 2 4
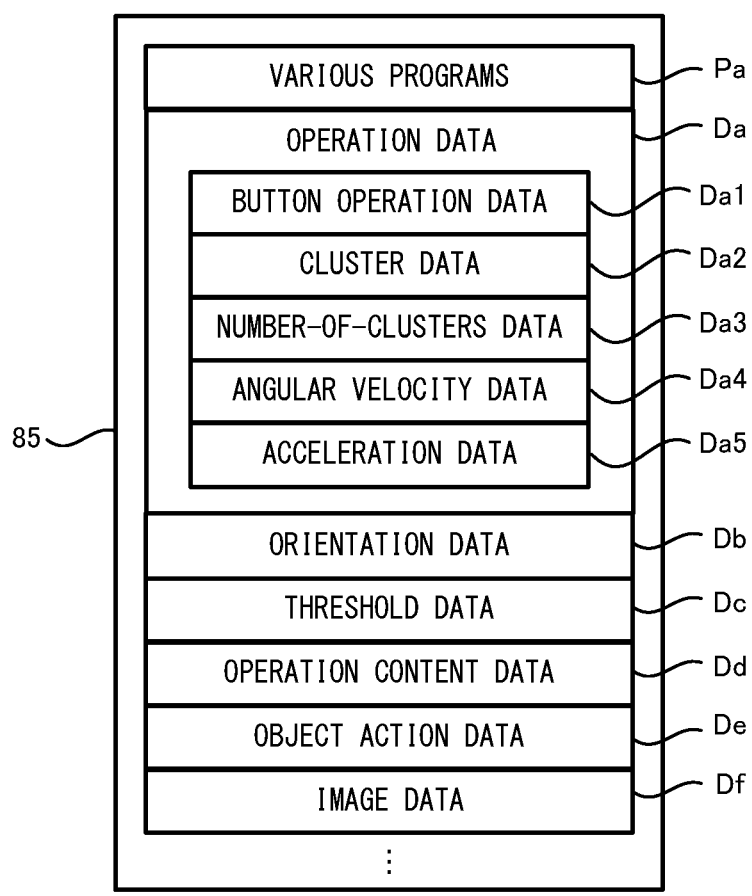

INFORMATION PROCESSING SYSTEM, STORAGE MEDIUM HAVING STORED THEREIN INFORMATION PROCESSING PROGRAM, INFORMATION PROCESSING METHOD, AND INFORMATION PROCESSING APPARATUS

CROSS REFERENCE TO RELATED APPLICATION

The disclosure of Japanese Patent Application No. 2018-005365, filed on Jan. 17, 2018, is incorporated herein by reference.

FIELD

The technology shown here relates to an information processing system, a storage medium having stored therein an information processing program, an information processing method, and an information processing apparatus for performing processing corresponding to a user operation.

BACKGROUND AND SUMMARY

Conventionally, there is an accessory that is connected to a mobile apparatus, thereby adding a function to the mobile apparatus.

In the accessory, however, there is room for improvement in allowing a greater variety of game operations.

Therefore, it is an object of an exemplary embodiment to provide an information processing system, a storage medium having stored therein an information processing program, an information processing method, and an information processing apparatus that are capable of achieving a greater variety of user operations.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

In an exemplary configuration of an information processing system according to the exemplary embodiment, an information processing system comprises a device comprising an inertial sensor, an image capturing unit, a detection target portion, and an operation section. The detection target portion is captured by the image capturing unit. The operation portion is operated by a user and causes the detection target portion to move in conjunction with the operation portion in accordance with the operation. The information processing system comprises at least one computer configured to: perform a first process that is information processing; detect a detection target portion image representing the detection target portion comprised in a captured image captured by the image capturing unit; specify at least one of a position and a shape of the detection target portion image in the captured image; based on the at least one of the position and the shape of the detection target portion image in the captured image, determine whether or not a condition for performing the first process is satisfied; and change the condition based on data output from the inertial sensor.

Based on the above, when a predetermined condition is satisfied based on at least one of the position and the shape of a detection target portion image obtained by capturing a detection target portion that moves in conjunction with an operation, a first process is performed, and the predetermined condition is changed based on data output from an inertial sensor. Thus, it is possible to achieve a greater variety of user operations using a device.

Further, the detection target portion may move along a movement path in accordance with the operation. In the determining, when the detection target portion image in the captured image is located in at least one of a predetermined position and a predetermined range based on the movement path, it may be determined that the condition for performing the first process is satisfied.

Based on the above, based on the position of the detection target portion that moves along a predetermined movement path, it is possible to determine whether or not the first process is to be performed.

Further, in the changing, the at least one of the predetermined position and the predetermined range may be changed based on the data output from the inertial sensor, thereby changing the condition.

Based on the above, it is possible to easily change the predetermined condition.

Further, in the changing, the at least one of the predetermined position and the predetermined range may be changed based on the movement path, thereby changing the condition.

Based on the above, it is possible to change the predetermined condition in accordance with a movement path.

Further, in the changing, in a moving direction of the detection target portion image in the captured image when the detection target portion moves along the movement path in accordance with an operation of the user, the at least one of the predetermined position and the predetermined range may be moved based on the data output from the inertial sensor, thereby changing the condition.

Based on the above, based on the data output from the inertial sensor, at least one of a predetermined position and a predetermined range for determining the position of the detection target portion moves in the same direction as the direction in which the detection target portion moves in accordance with a predetermined operation of a user. Thus, in accordance with the data output from the inertial sensor, it is less likely that it is determined that the predetermined operation is performed. Thus, using the data output from the inertial sensor, it is possible to make an adjustment to prevent an erroneous determination that the predetermined operation is performed.

Further, in the changing, the movement of the at least one of the predetermined position and the predetermined range in the moving direction may be limited to within a certain limit value, thereby changing the condition.

Based on the above, the movement of the at least one of the predetermined position and the predetermined range for determining the position of the detection target portion is limited, whereby it is possible to deal with an unexpected user operation or deal with an erroneous determination.

Further, in the changing, an orientation of the user operating the device may be estimated based on the data output from the inertial sensor, and when the orientation is a predetermined orientation, the condition may be changed.

Based on the above, it is possible to change the predetermined condition in accordance with the operation orientation of a user.

Further, the detection target portion may move in conjunction with a motion of the operation portion that moves in accordance with a change in an orientation of the user operating the operation portion.

Based on the above, it is possible to perform the first process in accordance with a change in the orientation of a user using an operation section.

Further, the computer may be further configured to generate a game image comprising a game object. In the performance of the first process, a process of, based on the at least one of the position and the shape of the detection target portion image, controlling at least one of an orientation and an action of the game object may be performed as the first process.

Based on the above, it is possible to control at least one of the orientation and the action of a game object in accordance with a user operation using an operation section.

Further, in the performance of the first process, the first process may be performed based on the at least one of the position and the shape of the detection target portion image, and a second process different from the first process may be performed based on the data output from the inertial sensor.

Based on the above, it is possible to achieve both the first process corresponding to a user operation using an operation section of the device, and a second process corresponding to a user operation using at least one of the orientation and the motion of the device.

Further, in the performance of the first process, a process of controlling at least one of an orientation and an action of a game object based on the data output from the inertial sensor may be performed as the second process.

Based on the above, it is possible to perform as the second process the process of controlling at least one of the orientation and the action of a game object in accordance with the user operation using the at least one of the orientation and the motion of the device.

Further, the device may further comprise a connection portion. The connection portion connects the operation portion and the detection target portion to cause the detection target portion to move in conjunction with a motion of the operation portion.

Based on the above, by operating an operation section, it is possible to cause the detection target portion connected to the operation section via a connection portion to move in conjunction with the operation section. Thus, it is possible to vary operations using the operation section.

Further, the detection target portion may change to a different image capturing shape in conjunction with an operation on the operation portion. In the determining, when the detection target portion image is specified as a predetermined shape, it may be determined that the first process is to be performed.

Based on the above, it is possible to achieve a greater variety of operations using an operation section.

Further, in the changing, when the data output from the inertial sensor indicates a predetermined orientation or a predetermined motion of the device, the condition may not be changed.

Based on the above, it is possible to set an appropriate predetermined condition according to a user operation.

Further, in the performance of the first process, a process of, based on the at least one of the position and the shape of the detection target portion image, advancing a game by controlling a game object may be performed as the first process. In the changing, based on the data output from the inertial sensor, the condition may be repeatedly changed during the game.

Based on the above, as compared with a calibration process performed only before a game is started, the predetermined condition is repeatedly changed during the game. Thus, it is possible to appropriately deal with a user operation during the game.

Further, the image capturing unit may be detachably fixed to the device.

Based on the above, the detection target portion moves in the device in accordance with an operation on an operation section or the orientation of a user, while an image capturing section is fixed without moving relative to the device. Thus, it is possible to accurately detect the motion of the detection target portion.

Further, the exemplary embodiment may be carried out in the forms of a storage medium having stored therein an information processing program, an information processing method, and an information processing apparatus.

According to the exemplary embodiment, it is possible to achieve a greater variety of user operations.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 8 is a diagram showing a non-limiting example of the state where a user performs a game operation wearing a case 200 and a headwear 300;

FIG. 24 is a diagram showing a non-limiting example of a data area set in a DRAM 85 of the main body apparatus 2;

DETAILED DESCRIPTION OF NON-LIMITING EXAMPLE EMBODIMENTS

Figure 1:
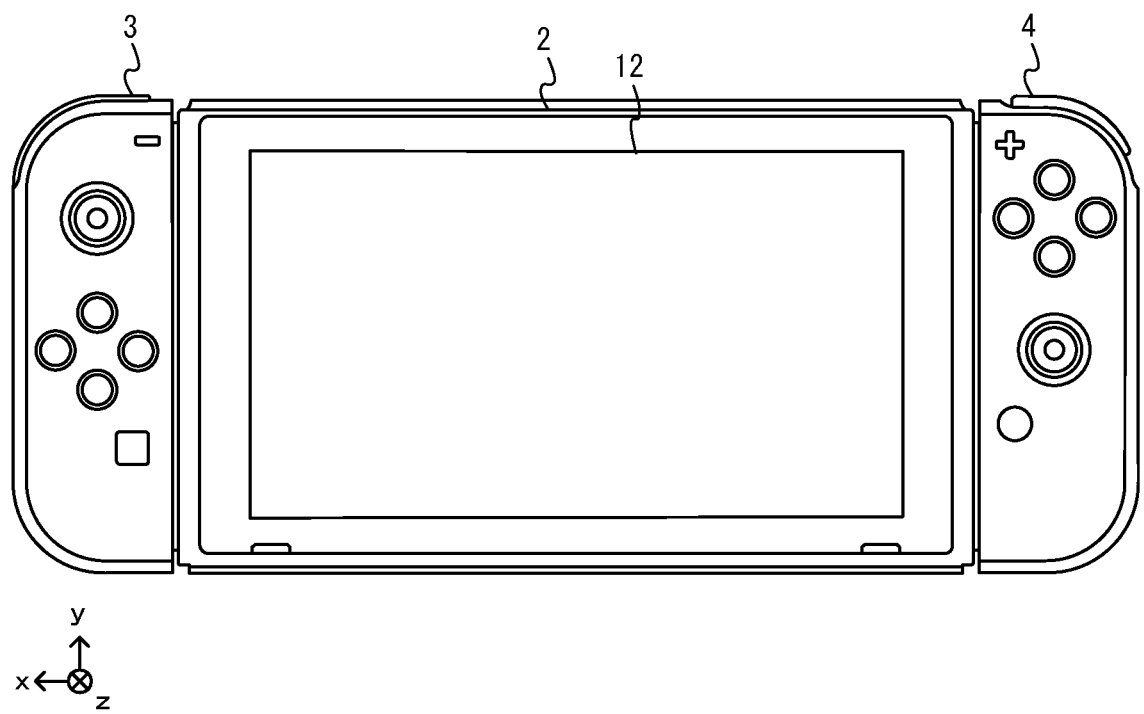
FIG. 1 is a diagram showing a non-limiting example of the state where a left controller 3 and a right controller 4 are attached to a main body apparatus 2.

A game system, which is an example of an information processing system according to an exemplary embodiment, is described below. A game system includes a main body apparatus (an information processing apparatus; which functions as a game apparatus main body in the exemplary embodiment) 2, a left controller 3, a right controller 4, a case 200, and a headwear 300. Each of the left controller 3 and the right controller 4 is attachable to and detachable from the main body apparatus 2. That is, the game system can be used as a unified apparatus obtained by attaching each of the left controller 3 and the right controller 4 to the main body apparatus 2. Further, in the game system, the main body apparatus 2, the left controller 3, and the right controller 4 can also be used as separate bodies (see FIG. 2). Further, the case 200 and the headwear 300 in the game system can be used as extension operation devices by attaching controllers (e.g., the left controller 3 and the right controller 4) to the inside of the case 200 and the headwear 300. Hereinafter, first, the hardware configuration of the game system according to the exemplary embodiment is described, and then, the control of the game system according to the exemplary embodiment is described. It should be noted that the extension operation device (the case 200) to the inside of which the right controller 4 is attached corresponds to an example of a device including an inertial sensor, an image capturing section, a detection target portion, and an operation section according to the exemplary embodiment.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system. The main body apparatus 2 includes a display 12. Each of the left controller 3 and the right controller 4 is an apparatus including operation sections with which a user provides inputs.

Figure 2:
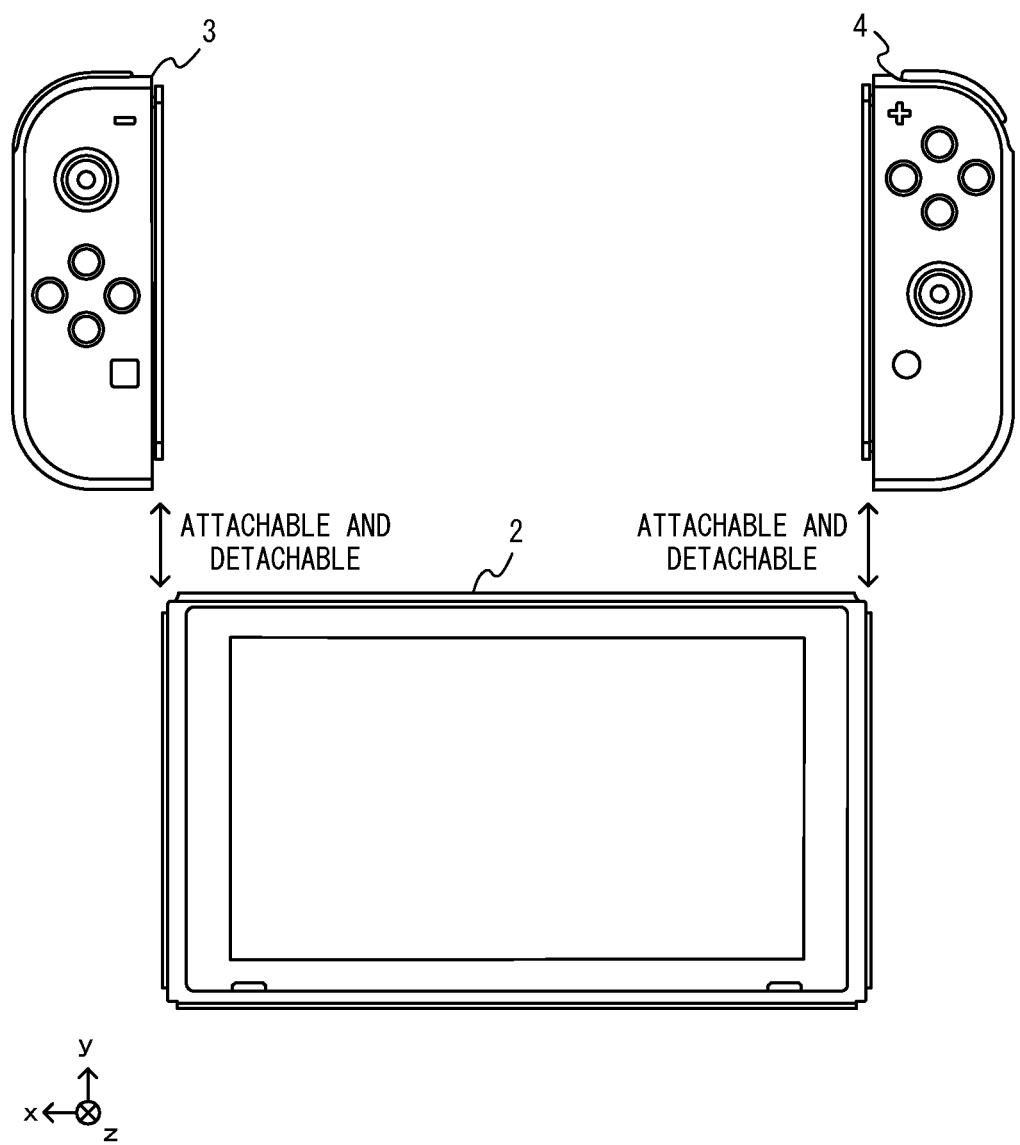
FIG. 2 is a diagram showing a non-limiting example of the state where each of the left controller 3 and the right controller 4 is detached from the main body apparatus 2.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
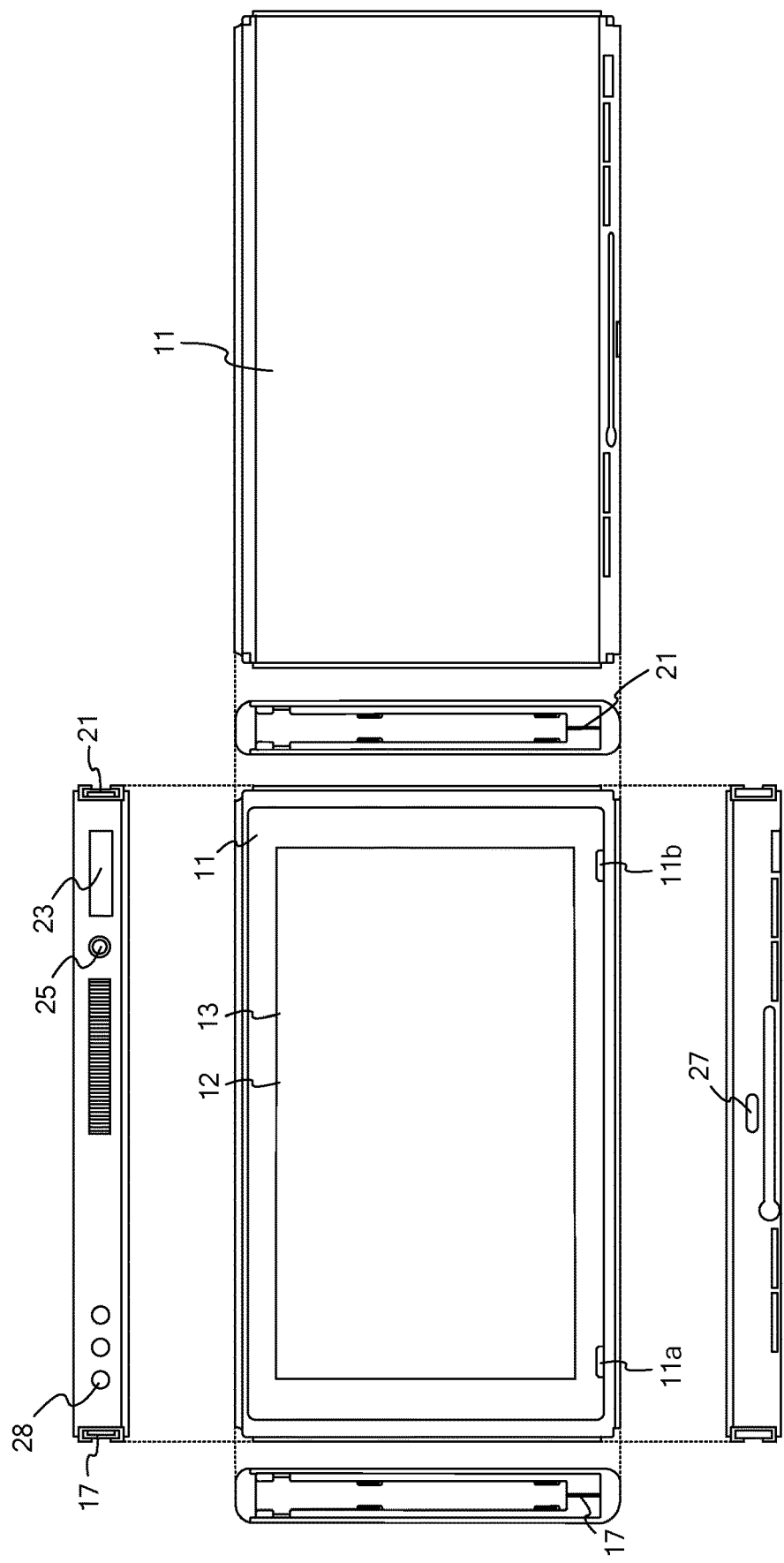
FIG. 3 is six orthogonal views showing a non-limiting example of the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system and an information processing apparatus of the same type as the game system. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
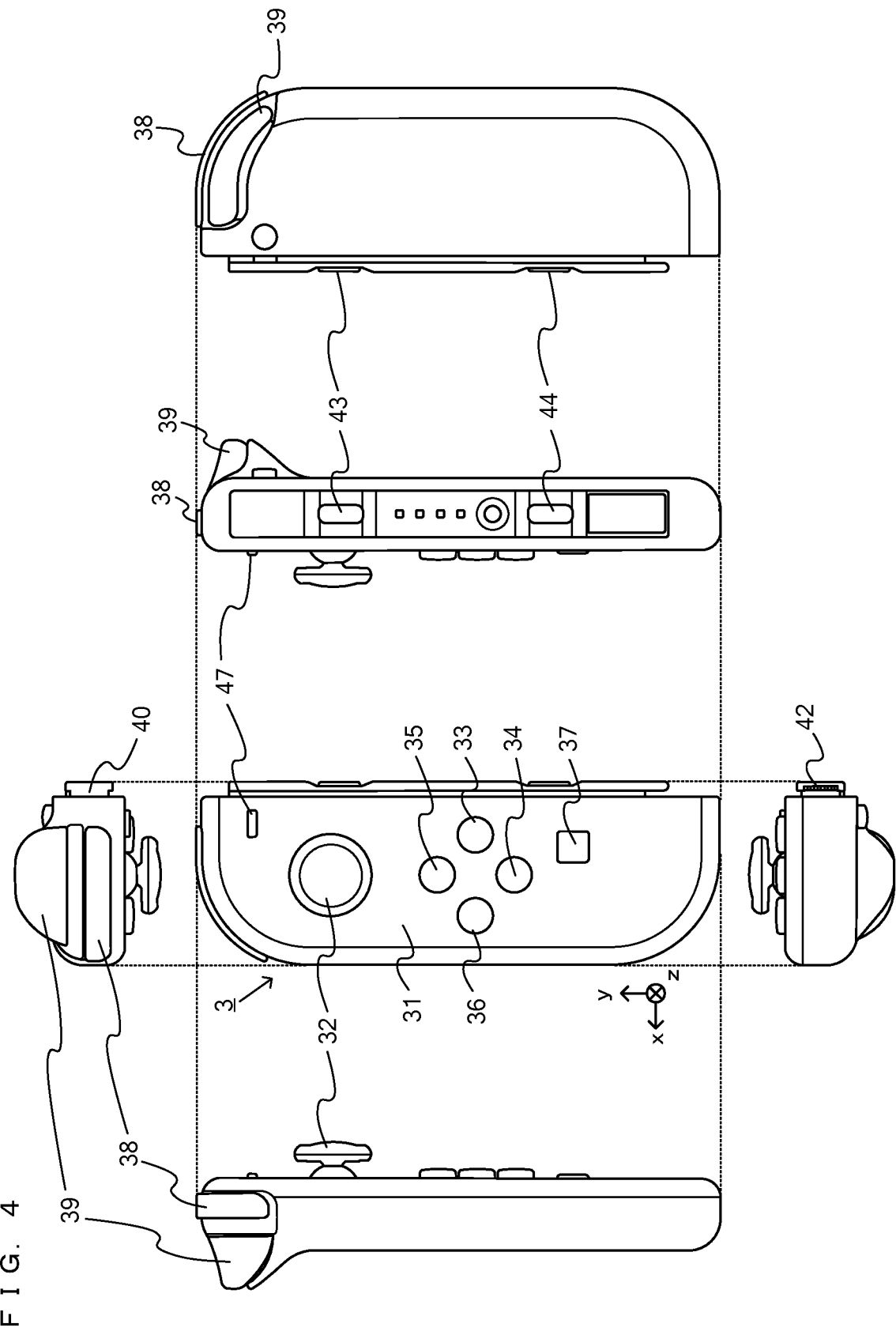
FIG. 4 is six orthogonal views showing a non-limiting example of the left controller 3.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
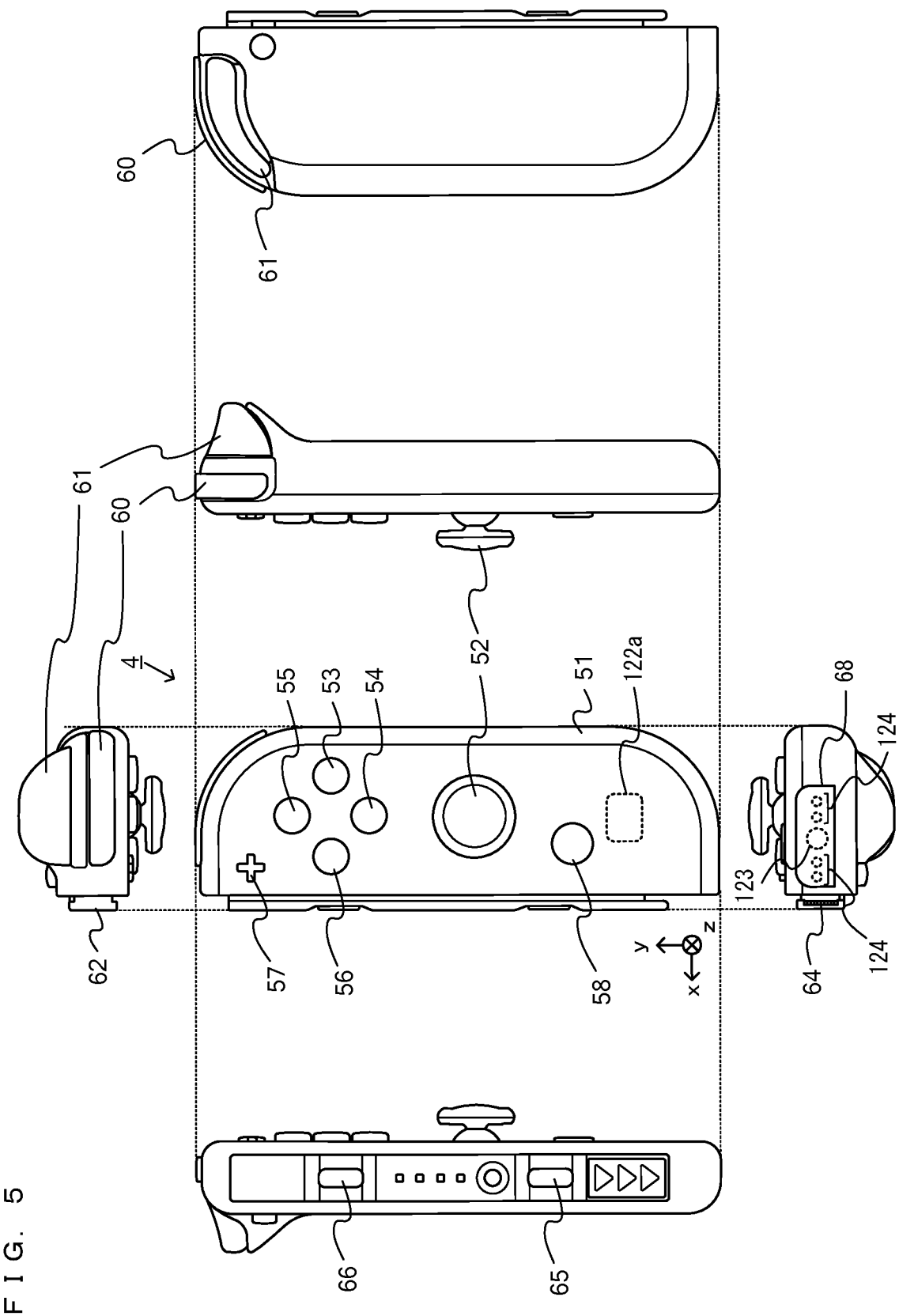
FIG. 5 is six orthogonal views showing a non-limiting example of the right controller 4.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, a window portion 68 is provided on a lower side surface of the housing 51. Although the details will be described later, the right controller 4 includes an infrared image capturing section 123 and an infrared light-emitting section 124, which are placed within the housing 51. The infrared image capturing section 123 captures a portion around the right controller 4 through the window portion 68 such that a down direction of the right controller 4 (a negative y-axis direction shown in FIG. 5) is the image capturing direction. The infrared light-emitting section 124 emits infrared light through the window portion 68 to an image capturing target to be captured by the infrared image capturing section 123 such that a predetermined range about the down direction of the right controller 4 (the negative y-axis direction shown in FIG. 5) is the emission range. The window portion 68 is used to protect a lens of a camera of the infrared image capturing section 123, a light emitter of the infrared light-emitting section 124, and the like and composed of a material (e.g., a transparent material) that transmits light of a wavelength sensed by the camera and light emitted from the light emitter. It should be noted that the window portion 68 may be a hole formed in the housing 51. It should be noted that in the exemplary embodiment, the infrared image capturing section 123 itself includes a filter member for inhibiting the transmission of light of a wavelength other than light sensed by the camera (infrared light in the exemplary embodiment). In another exemplary embodiment, the window portion 68 may have the function of a filter.

Further, although the details will be described later, the right controller 4 includes an NFC communication section 122. The NFC communication section 122 performs short-range wireless communication based on the NFC (Near Field Communication) standard. The NFC communication section 122 includes an antenna 122*a*, which is used for short-range wireless communication, and a circuit (e.g., an NFC chip) for generating a signal (a radio wave) to be sent from the antenna 122*a*. It should be noted that the NFC communication section 122 may perform short-range wireless communication through any proximity communication (or contactless communication), instead of performing short-range wireless communication based on the NFC standard. Here, the NFC standard can be used for proximity communication (contactless communication), and "may perform short-range wireless communication through any proximity communication (or contactless communication)" is intended to mean that short-range wireless communication may be performed through other proximity communication except for proximity communication based on the NFC standard.

Further, the right controller 4 includes a terminal 64 for the right controller 4 to perform wired communication with the main body apparatus 2.

Figure 6:
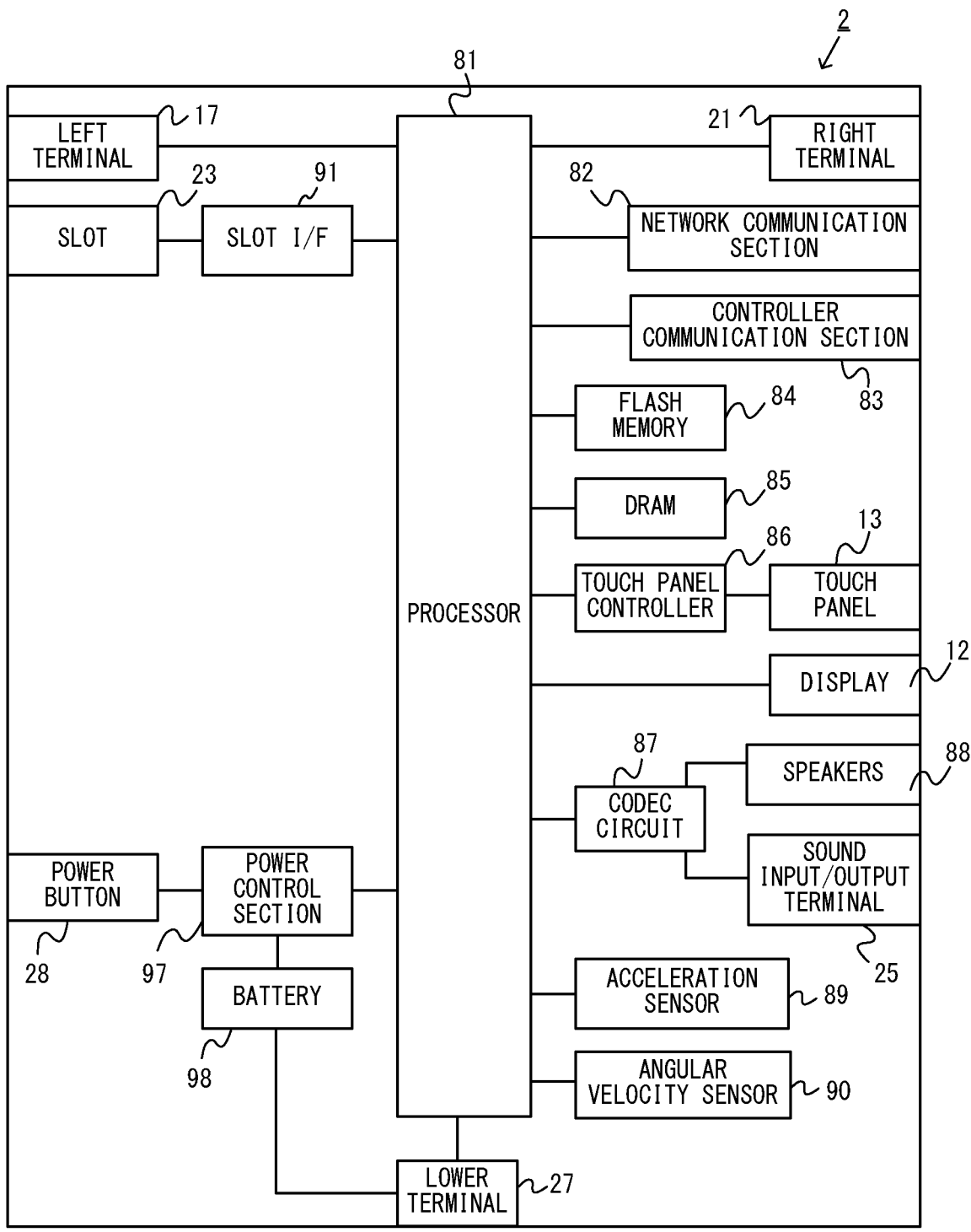
FIG. 6 is a block diagram showing a non-limiting example of the internal configuration of the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

Further, the main body apparatus 2 includes an acceleration sensor 89. In the exemplary embodiment, the acceleration sensor 89 detects the magnitudes of accelerations along predetermined three axial (e.g., xyz axes shown in FIG. 1) directions. It should be noted that the acceleration sensor 89 may detect an acceleration along one axial direction or accelerations along two axial directions.

Further, the main body apparatus 2 includes an angular velocity sensor 90. In the exemplary embodiment, the angular velocity sensor 90 detects angular velocities about predetermined three axes (e.g., the xyz axes shown in FIG. 1). It should be noted that the angular velocity sensor 90 may detect an angular velocity about one axis or angular velocities about two axes.

The acceleration sensor 89 and the angular velocity sensor 90 are connected to the processor 81, and the detection results of the acceleration sensor 89 and the angular velocity sensor 90 are output to the processor 81. Based on the detection results of the acceleration sensor 89 and the angular velocity sensor 90, the processor 81 can calculate information regarding the motion and/or the orientation of the main body apparatus 2.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
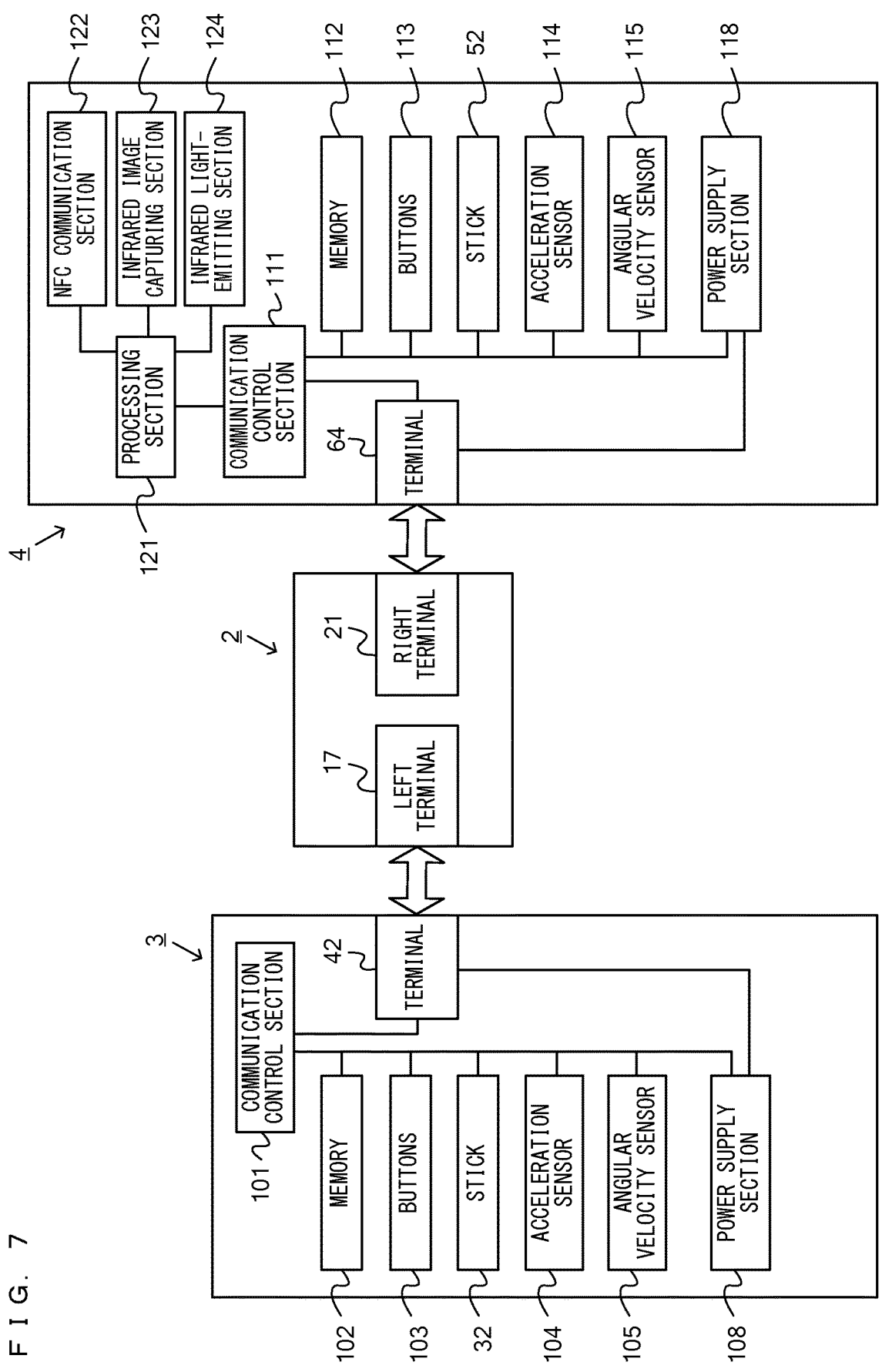
FIG. 7 is a block diagram showing non-limiting examples of the internal configurations of the main body apparatus 2, the left controller 3, and the right controller 4.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes the NFC communication section 122, which performs short-range wireless communication based on the NFC standard. The NFC communication section 122 has the function of a so-called NFC reader/writer. Here, the term "short-range wireless communication" as used herein includes a communication method where a radio wave from an apparatus (here, the right controller 4) develops an electromotive force (e.g., by electromagnetic induction) in another device (here, a device near the antenna 122*a*). The other device can operate by the developed electromotive force, and may or may not have a power supply. When the right controller 4 (the antenna 122*a*) and a communication target come close to each other (typically, the distance between the right controller 4 and the communication target becomes dozen centimeters or less), the NFC communication section 122 becomes able to communicate with the communication target. The communication target is any apparatus capable of performing short-range wireless communication with the NFC communication section 122 and is, for example, an NFC tag or a storage medium having the function of an NFC tag. Alternatively, the communication target may be another apparatus having an NFC card emulation function.

Further, the right controller 4 includes the infrared image capturing section 123. The infrared image capturing section 123 includes an infrared camera for capturing a portion around the right controller 4. In the exemplary embodiment, the infrared image capturing section 123 is used to capture image capturing target members placed within the extension operation device (e.g., the case 200). The main body apparatus 2 and/or the right controller 4 calculate information of the captured image capturing target members (e.g., the average luminance, the area, the coordinates of the center of gravity, and the like of each image capturing target member), and based on the information, determine the content of an operation performed on the extension operation device. Further, the infrared image capturing section 123 may capture an image using ambient light, but in the exemplary embodiment, includes the infrared light-emitting section 124, which emits infrared light. The infrared light-emitting section 124 emits infrared light, for example, in synchronization with the timing when the infrared camera captures an image. Then, the infrared light emitted from the infrared light-emitting section 124 is reflected by image capturing target members, and the infrared camera receives the reflected infrared light, thereby acquiring an image of the infrared light. This enables the infrared image capturing section 123 to obtain a clearer infrared light image. It should be noted that the infrared image capturing section 123 and the infrared light-emitting section 124 may be provided as different devices in the right controller 4, or may be provided as a single device in the same package in the right controller 4. Further, in the exemplary embodiment, the infrared image capturing section 123 including an infrared camera is used. In another exemplary embodiment, a visible light camera (a camera using a visible light image sensor) may be used as image capturing means, instead of the infrared camera.

The right controller 4 includes a processing section 121. The processing section 121 is connected to the communication control section 111. Further, the processing section 121 is connected to the NFC communication section 122, the infrared image capturing section 123, and the infrared light-emitting section 124. In accordance with a command from the main body apparatus 2, the processing section 121 performs the process of managing the NFC communication section 122. For example, in accordance with a command from the main body apparatus 2, the processing section 121 controls the operation of the NFC communication section 122. Further, the processing section 121 controls the start of the NFC communication section 122 or controls the operations (specifically, reading, writing, and the like) of the NFC communication section 122 performed on a communication target (e.g., an NFC tag). Further, the processing section 121 receives, from the main body apparatus 2, information to be transmitted to the communication target via the communication control section 111 and passes the information to the NFC communication section 122. Further, the processing section 121 acquires, from the NFC communication section 122, information received from the communication target and transmits the information to the main body apparatus 2 via the communication control section 111.

Further, the processing section 121 includes a CPU, a memory, and the like. Based on a predetermined program (e.g., an application program for performing image processing and various calculations) stored in a storage device (e.g., a non-volatile memory or the like) (not shown) included in the right controller 4, and in accordance with a command from the main body apparatus 2, the processing section 121 performs the process of managing the infrared image capturing section 123. For example, the processing section 121 causes the infrared image capturing section 123 to perform an image capturing operation. Further, the processing section 121 acquires and/or calculates information based on an image capturing result (information of a captured image, information calculated from this information, or the like) and transmits the information to the main body apparatus 2 via the communication control section 111. Further, in accordance with a command from the main body apparatus 2, the processing section 121 performs the process of managing the infrared light-emitting section 124. For example, in accordance with a command from the main body apparatus 2, the processing section 121 controls the light emission of the infrared light-emitting section 124. It should be noted that a memory used by the processing section 121 to perform processing may be provided in the processing section 121 or may be the memory 112.

The right controller 4 includes a power supply section 118. The power supply section 118 has a function similar to that of the power supply section 108 of the left controller 3 and operates similarly to the power supply section 108.

Next, with reference to FIG. 8, a description is given of operations using the case 200 and the headwear 300, which are examples of the extension operation devices. FIG. 8 is a diagram showing an example of the state where the user performs a game operation wearing the case 200 and the headwear 300. In the exemplary embodiment, the right controller 4 can be attached to the case 200, and based on data transmitted from the right controller 4 attached to the case 200, processing corresponding to the content of an operation on the case 200 is executed. Further, the left controller 3 can be attached to the headwear 300, and based on data transmitted from the left controller 3 attached to the headwear 300, processing corresponding to the content of an operation on the headwear 300 is executed. Here, although the details will be described later, the content of an operation on the case 200 is detected based on a captured image captured by the infrared image capturing section 123 or the detection results of the inertial sensors provided in the right controller 4. Thus, the case 200 does not need to have an electrical structure such as an electronic circuit for detecting the content of an operation performed by the user, or transmitting the detection result to the main body apparatus 2. Further, the content of an operation on the headwear 300 is detected based on the detection results of the inertial sensors provided in the left controller 3. Thus, the headwear 300 does not need to have an electrical structure such as an electronic circuit for detecting the content of an operation performed by the user, or transmitting the detection result to the main body apparatus 2, either. Thus, according to the exemplary embodiment, it is possible to simplify the configurations of the case 200 and the headwear 300, which are examples of the extension operation devices.

For example, in the exemplary embodiment, as shown in FIG. 8, the user wears the case 200 by carrying the case 200 on their back and pulls or loosens a plurality of string members 204 provided in the case 200, thereby performing an operation using the case 200. For example, the user attaches operation sections (operation portions 250 and operation portions 260 described later) provided at one ends of the string members 204 to both legs and both arms. Consequently, when the user moves their left leg, the string member 204 connected to the operation portion 250 attached to the left leg is pulled or loosened. When the user moves their right leg, the string member 204 connected to the operation portion 250 attached to the right leg is pulled or loosened. Further, when the user moves their left arm, the string member 204 connected to the operation portion 260 attached to the left arm is pulled or loosened. When the user moves their right arm, the string member 204 connected to the operation portion 260 attached to the right arm is pulled or loosened. As described above, in accordance with the form in which the user moves both arms and both legs, different string members 204 are pulled or loosened. Further, in the exemplary embodiment, the user can also perform an operation using the case 200 by tilting the case 200 that the user carries on their back. It should be noted that the case 200 corresponds to an example of the device including the inertial sensor, the image capturing section, the detection target portion, the operation section, and the like.

Further, in the exemplary embodiment, as shown in FIG. 8, the user puts the headwear 300 on their head like a helmet or a hat and tilts the headwear 300 forward, backward, to the left, and to the right, thereby performing an operation using the headwear 300.

In accordance with such operations using the case 200 and the headwear 300, a player object PO placed in a virtual space performs an action. An image of the virtual space obtained by reflecting the action of the player object PO is displayed on a display device (e.g., the display 12 of the main body apparatus 2). For example, when the user performs an action so that the state where their left arm to which the operation portion 260 is attached is shrunk changes to the state where the left arm is stretched, the string member 204 connected to the operation portion 260 is pulled. By this operation of pulling the string member 204, the string member 204 moves so as to be pulled out of a case main body 201 (see FIG. 9) of the case 200. Such a motion of the string member 204 is detected within the case 200, whereby it is estimated that the user carrying the case 200 on their back performs the action of stretching their left arm, and the player object PO also performs an action so as to stretch its left arm in the virtual space. Further, when the user performs an action so as to lift their left leg to which the operation portion 250 is attached in the state where the left leg is stretched, the string member 204 connected to the operation portion 250 loosens. By this operation of loosening the string member 204, the string member 204 moves so as to return to the case main body 201 (see FIG. 9) of the case 200. Such a motion of the string member 204 is detected within the case 200, whereby it is estimated that the user carrying the case 200 on their back performs the action of lifting their left leg, and the player object PO also performs the action of lifting its left leg in the virtual space. That is, when the user moves a part to which the operation portion 250 or the operation portion 260 to which any of the string members 204 is connected is attached, a part of the player object PO corresponding to this part (e.g., the same part as the part moved by the user) performs an action. It should be noted that in accordance with an operation using the case 200, not only may the player object PO placed in the virtual space perform an action, but also the player object PO may change in another form in the virtual space. For example, in accordance with a predetermined operation using the case 200, the display form of the player object PO may change (e.g., the color of the player object PO may change, the player object PO may mutate into another object, the size of the player object PO may change, or the ability of the player object PO may change).

Here, the right controller 4 attached to the case 200 includes the inertial sensors (the acceleration sensor 114 and the angular velocity sensor 115). Thus, it is possible to calculate the orientation and/or the motion of the right controller 4 (i.e., the orientation and/or the motion of the case 200) using the detection results of the inertial sensors. In the exemplary embodiment, in accordance with such an orientation and/or a motion of the case 200, it is possible to control the action of the player object PO. For example, when the user carrying the case 200 on their back moves so as to lean the entirety of their body to the right, the case 200 itself also moves so as to lean to the right. Thus, such a motion is detected by the inertial sensors of the right controller 4, whereby it can be estimated that the user carrying the case 200 on their back performs the action of leaning to the right. Then, when it is estimated that the user performs the action of leaning to the right, the player object PO also performs the action of leaning to the right or revolving to the right in the virtual space. Further, when the user carrying the case 200 on their back jumps, the case 200 itself also moves up and down. Thus, such a motion is detected by the inertial sensors of the right controller 4, whereby it can be estimated that the user carrying the case 200 on their back jumps. Then, when it is estimated that the user jumps, the player object PO also jumps or flies in the air in the virtual space. That is, when the user moves the entirety of the case 200, the entirety of the player object PO performs an action in accordance with the motion or the orientation of the entirety of the case 200. It should be noted that in the exemplary embodiment, the inertial sensors are provided in the case 200 by attaching the right controller 4 to the case 200. Thus, the inertial sensors are detachably attached to the case 200. Alternatively, in another form, the inertial sensors may be fixedly provided in (i.e., cannot be attached to and detached from) the case 200. Further, the right controller 4 itself may be fixedly provided in (i.e., cannot be attached to and detached from) the case 200. In this case, the infrared image capturing section 123 (the image capturing section) built into the right controller 4 is also fixedly provided in the case 200.

Further, the left controller 3 attached to the headwear 300 includes the inertial sensors (the acceleration sensor 104 and the angular velocity sensor 105). Thus, it is possible to calculate the orientation and/or the motion of the left controller 3 (i.e., the orientation and/or the motion of the headwear 300) using the detection results of the inertial sensors. In the exemplary embodiment, in accordance with such an orientation and/or a motion of the headwear 300, it is possible to control the action of the player object PO. For example, when the user wearing the headwear 300 moves so as to lean their head to the right, the headwear 300 itself also moves so as to lean to the right. Thus, such a motion is detected by the inertial sensors of the left controller 3, whereby it can be estimated that the user wearing the headwear 300 performs the action of tilting to the right. Then, when it is estimated that the user performs the action of tilting to the right, the player object PO also performs the action of tilting to the right or revolving to the right in the virtual space. That is, when the user moves the entirety of the headwear 300, the entirety of the player object PO performs an action in accordance with the motion or the orientation of the entirety of the headwear 300. It should be noted that in the exemplary embodiment, the inertial sensors are provided in the headwear 300 by attaching the left controller 3 to the headwear 300. Thus, the inertial sensors are detachably attached to the headwear 300. Alternatively, in another form, the inertial sensors may be fixedly provided in (i.e., cannot be attached to and detached from) the headwear 300.

As described above, the player object PO performing an action in accordance with operations using the case 200 and the headwear 300 is displayed on the display device (e.g., the display 12 of the main body apparatus 2). Thus, the user performing operations wearing the case 200 and the headwear 300 enjoys a game by viewing the display device on which the player object PO is displayed. The viewpoint from which the player object PO is displayed on the display device, however, may be placed at any position in the virtual space. As a first example, a virtual space image in which the player object PO is viewed from behind the player object PO may be displayed on the display device. As a second example, a virtual space image from a first-person viewpoint of the player object PO may be displayed on the display device. As a third example, a virtual space image in which the player object PO is viewed from the front of the player object PO may be displayed on the display device. Here, depending on the viewpoint or the direction of the line of sight placed in the virtual space, it can be difficult for the user to understand the motion of the player object PO corresponding to the motion of the user themselves. However, a part or the action direction of the player object PO that performs an action in response to operations using the case 200 and the headwear 300 is set in accordance with the viewpoint and the direction of the line of sight, whereby it is possible to provide realistic game play.

Figure 9:
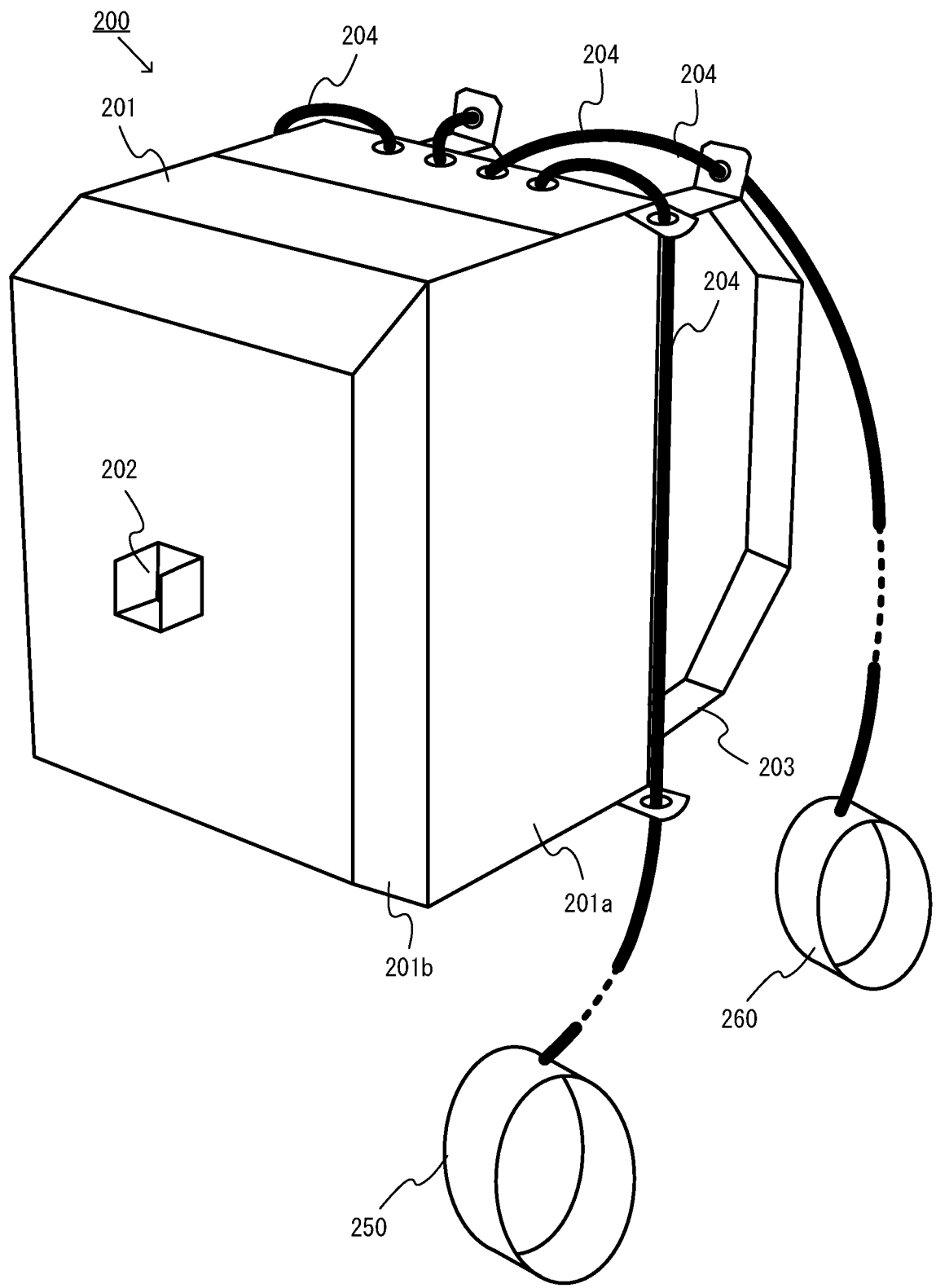
FIG. 9 is a diagram showing a non-limiting example of the external appearance of the case 200.
Figure 10:
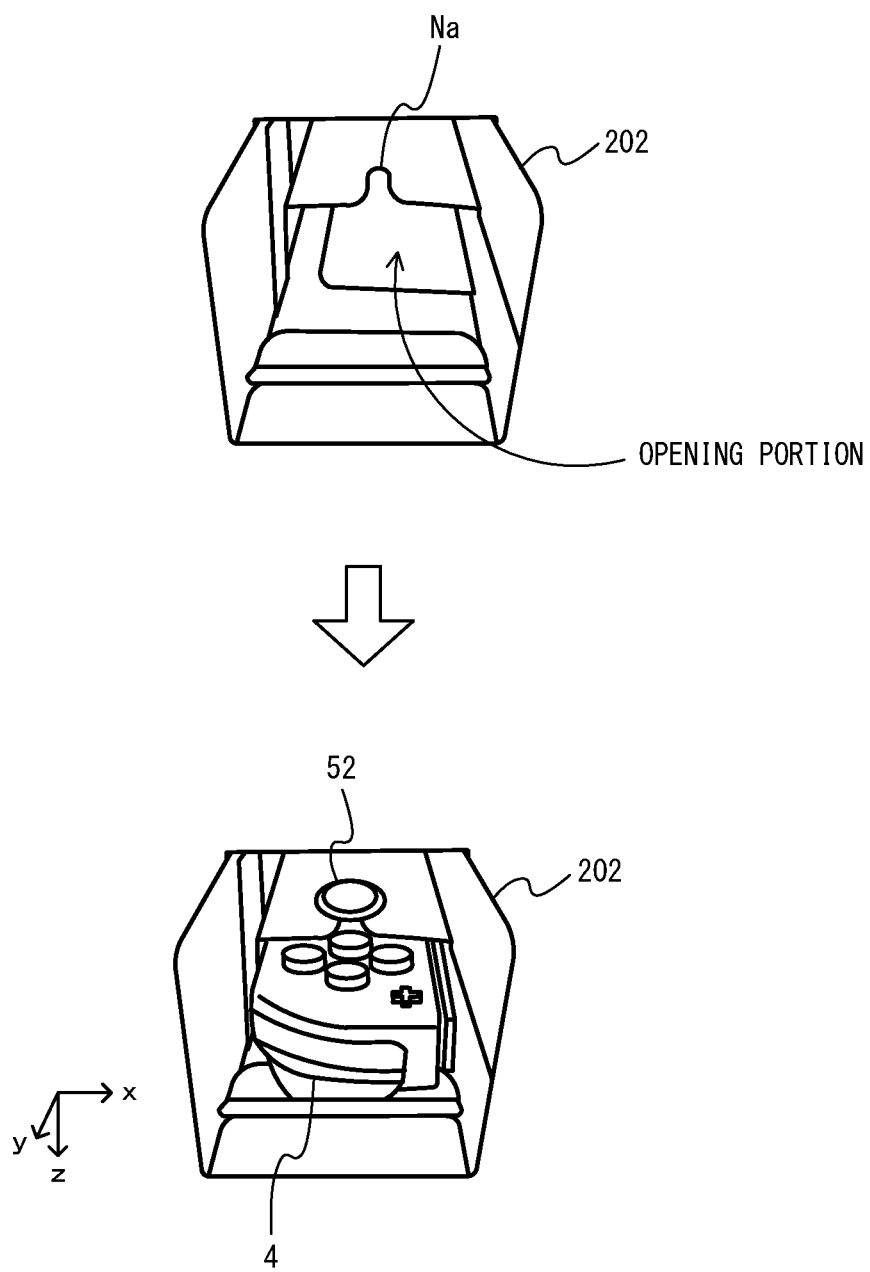
FIG. 10 is a diagram showing a non-limiting example of the state where the right controller 4 is attached to a controller placement portion 202 of the case 200.
Figure 11:
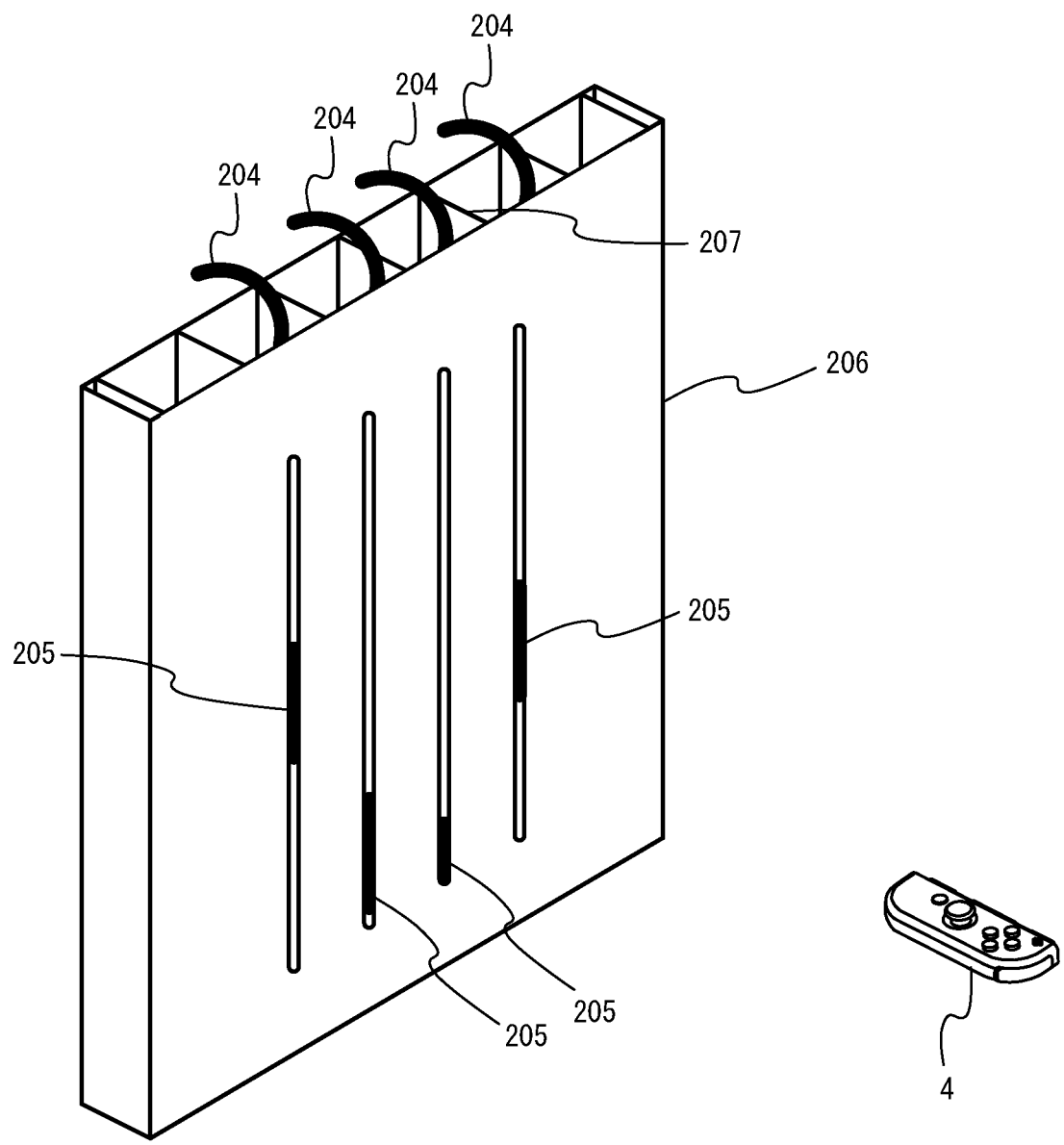
FIG. 11 is a diagram showing a non-limiting example of the state where the right controller 4 captures image capturing target members 205 provided within the case 200.
Figure 12:
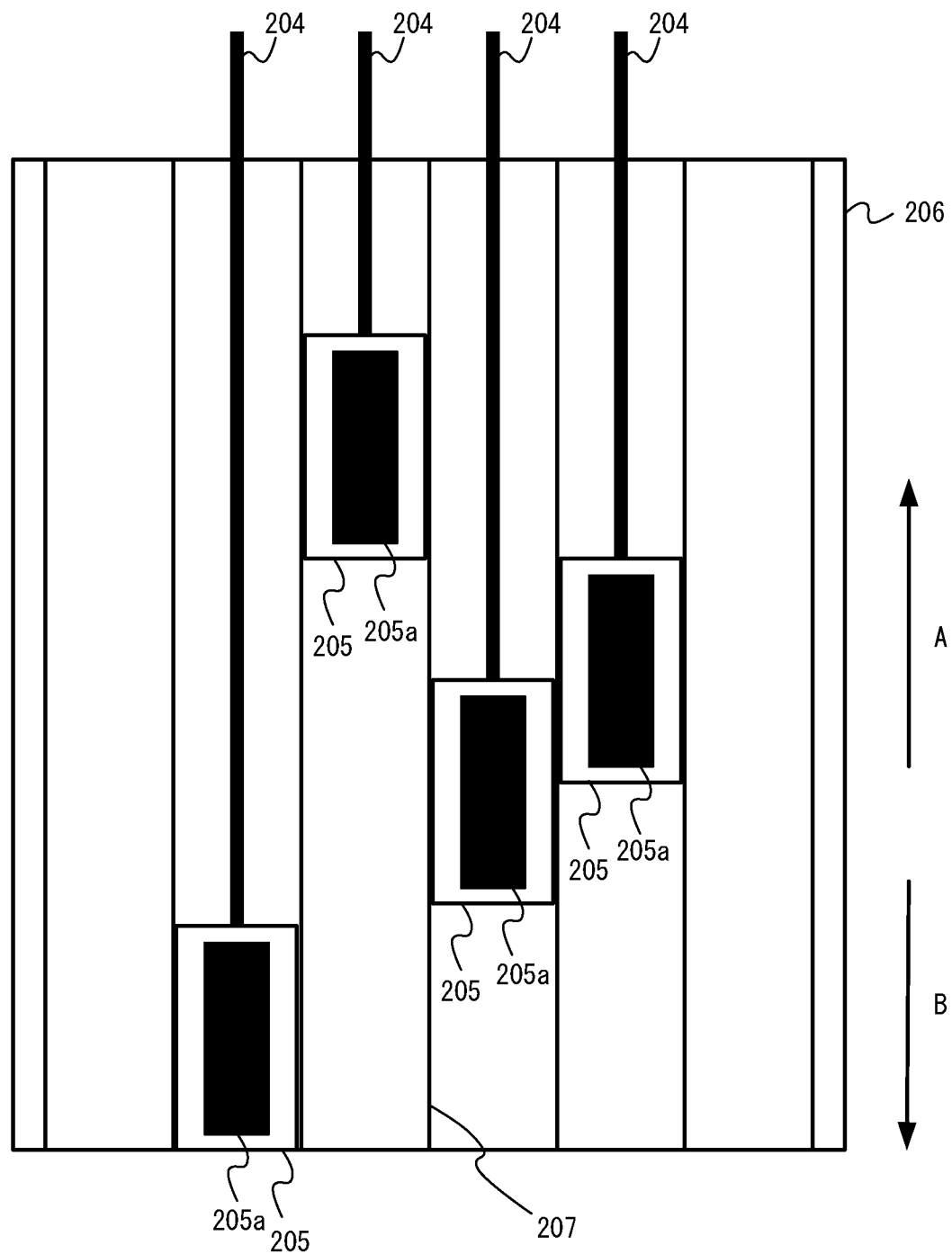
FIG. 12 is a diagram showing a non-limiting example of the state where the image capturing target members 205 move in a sliding manner in accordance with the motions of operation portions 250, operation portions 260, and string members 204.

Next, with reference to FIGS. 9 to 12, a description is given of the case 200, which is an example of one of the extension operation devices. It should be noted that FIG. 9 is a diagram showing an example of the external appearance of the case 200. FIG. 10 is a diagram showing an example of the state where the right controller 4 is attached to a controller placement portion 202 of the case 200. FIG. 11 is a diagram showing an example of the state where the right controller 4 captures image capturing target members 205 provided within the case 200. FIG. 12 is a diagram showing an example where the image capturing target members 205 move in a sliding manner in accordance with the motions of operation portions 250, operation portions 260, and string members 204.

In FIG. 9, the case 200 includes a case main body 201, a controller placement portion 202, shoulder belts 203, string members 204, operation portions 250, and operation portions 260. The entirety of the case 200 is shaped like a backpack. The two shoulder belts 203 are attached to the case main body 201, thereby allowing the user to carry the case 200 on their back. The two shoulder belts 203 are attached to the case main body 201, and the case main body 201 includes a front side main body 201a, which is a portion in contact with the back of the user when the user carries the case 200 on the back, and a back side main body 201b, which is a back surface portion when the user carries the case 200 on their back. Then, the front side main body 201a and the back side main body 201b are combined together, thereby forming in the case main body 201 an inner space shielded from external light.

In the front side main body 201a, the plurality of (four in FIG. 9) string members 204 are provided, which are configured to allow the operation of pulling the string members 204 out of the case main body 201 or returning the string members 204 to the case main body 201. Specifically, the string members 204 are placed in the state where one ends of the string members 204 are drawn to outside from a plurality of holes formed on an upper surface of the front side main body 201a, and the other ends are connected to the plurality of image capturing target members 205 (see FIGS. 11 and 12) provided within the front side main body 201a. Then, as described with reference to FIG. 8, when the user wears the case 200 carrying the case 200 on their back, an operation using the case 200 is performed by attaching the operation portions 250 and the operation portions 260 connected to one ends of the string members 204 to both legs, both arms, and the like of the user.

The back side main body 201b includes the controller placement portion 202 near the center of a back surface. In the controller placement portion 202, an opening portion is formed, which opens the inner space of the case main body 201 formed by the front side main body 201a and the back side main body 201b to outside on the back surface side of the back side main body 201b (i.e., outside the case main body 201). As shown in FIG. 10, the length in an up-down direction of the opening portion of the controller placement portion 202 is almost the same as the thickness (the length in a z-axis direction shown in FIG. 1) of the housing 51 of the right controller 4, and the length in a left-right direction of the opening portion of the controller placement portion 202 is almost the same as the length in the left-right direction (the maximum length in an x-axis direction shown in FIG. 1) of the housing 51 of the right controller 4. Thus, when the right controller 4 is placed in the state where the right controller 4 is inserted into the opening portion of the controller placement portion 202 such that a lower surface of the right controller 4 enters within the case main body 201, the opening portion is blocked by the housing 51. Then, a notch portion Na is formed on an upper surface of the opening portion of the controller placement portion 202. Consequently, when the right controller 4 is inserted into the opening portion such that the negative y-axis direction of the right controller 4 is the forward direction of the case 200 in the state where an upper surface of the right controller 4 is directed upward, the right controller 4 is placed in the controller placement portion 202 in the state where an operation shaft portion of the analog stick 52 of the right controller 4 fits the notch portion Na (see a lower part of the diagram in FIG. 10). When the right controller 4 is attached to the case 200 such that the case 200 is thus placed in the controller placement portion 202, a part of the right controller 4 is included in the inner space of the case 200, and the infrared image capturing section 123 can capture the inside of the inner space. It should be noted that the right controller 4 exemplified in FIG. 10 is attached such that a part of the right controller 4 is included in the inner space of the case 200. Alternatively, the right controller 4 may be attached such that the entirety of the right controller 4 is included in the inner space of the case 200, or the right controller 4 may be attached such that only the lower surface (the surface on which the window portion 68 is provided) faces the inner space of the case 200.

It should be noted that in the back side main body 201b, a communication target (e.g., an NFC tag) of the NFC communication section 122 may be provided near the controller placement portion 202. For example, in the state where the right controller 4 is placed in the controller placement portion 202, the communication target is placed in the back side main body 201b at the position where the communication target comes close to the antenna 122a of the right controller 4. Consequently, simultaneously with when the right controller 4 is attached to the controller placement portion 202, the right controller 4 can perform short-range communication with the communication target. The type of an extension operation device (here, the case 200) or unique identification information is stored in the communication target, whereby it is possible to confirm the reliability of the extension operation device to which the right controller 4 is attached.

As shown in FIGS. 11 and 12, the plurality of image capturing target members 205 are placed in the inner space of the case main body 201. The plurality of image capturing target members 205 are placed in slide portions 206 that allow the image capturing target members 205 to move in a sliding manner in an up-down direction (a direction A and a direction B shown in FIG. 12). The slide portions 206 include a partition portion 207, which divides the space in the slide portions 206 into lanes on which the plurality of image capturing target members 205 move in a sliding manner in the slide direction. Further, the slide portions 206 are fixedly provided in the front side main body 201a in the inner space of the case main body 201 such that upper opening portions of the respective lanes are placed at positions below the plurality of holes formed on the upper surface of the front side main body 201a.

The image capturing target members 205 include predetermined weights and are connected to the other ends of the string members 204. Then, the string members 204 connected to the image capturing target members 205 pass through the holes formed on the upper surface of the front side main body 201a formed in and above the lanes of the slide portions 206 and are drawn to outside the case main body 201. Thus, when the string members 204 connected to the image capturing target members 205 are pulled to outside the case main body 201 with forces greater than the weights of the image capturing members 205, the image capturing members 205 rise in the up direction (the direction A in FIG. 12) along the lanes of the slide portions 206. Further, when the string members 204 raising the image capturing members 205 are loosened, the image capturing members 205 fall in the down direction (the direction B in FIG. 12) along the lanes of the slide portions 206 with empty weights. As described above, in conjunction with the operation of pulling or loosening the string members 204 connected to the image capturing target members 205 using the operation portions 250 and 260, the plurality of image capturing target members 205 move in a sliding manner so as to rise and fall in the inner space of the case main body 201. It should be noted that the string members 204 correspond to an example of a connection portion.

As shown in FIG. 11, the slider portions 206 are at positions opposed to the infrared image capturing section 123 of the right controller 4 attached to the controller placement portion 202. Thus, in the state where the right controller 4 is attached to the controller placement portion 202, the infrared image capturing section 123 can capture the slider portions 206. Further, in the above state, the infrared light-emitting section 124 can emit infrared light to the slider portions 206. Thus, although the inner space of the case main body 201 is shielded from external light, the infrared light-emitting section 124 emits infrared light to the slider portions 206. Thus, the infrared image capturing section 123 can capture the slider portions 206.

In the slider portions 206, a plurality of slits are formed on a surface (a surface on the back side) opposed to the right controller 4 attached to the controller placement portion 202. In order that the positions of the image capturing target members 205 placed in the slider portions 206 can be viewed from the right controller 4 side, the slits are formed on the respective lanes such that the slide direction is a long axis direction. Thus, in a captured image captured by the infrared image capturing section 123, it is possible to recognize the positions of the image capturing target members 205 in the slider portions 206 through the slits.

At least a part (typically, a part including at least a portion viewable from the infrared image capturing section 123 through the slit) of each image capturing target member 205 includes a recognition portion 205a, which is composed of a material distinguishable from another portion in a captured image captured by the infrared image capturing section 123. For example, the recognition portion 205a may be composed of a material having retroreflective properties. Consequently, more infrared light emitted from the infrared light-emitting section 124 is reflected. Thus, it is easier to recognize the recognition portion 205a, i.e., the image capturing target member 205, in a captured image captured by the infrared image capturing section 123. It should be noted that the recognition portion 205a functions as a marker for passively reflecting infrared light to emit light. Alternatively, the recognition portion 205a may function as a marker for passively reflecting another type of light (e.g., visible light or ultraviolet light) in accordance with the properties of an image capturing section to emit light. Yet alternatively, the recognition portion 205a may actively emit light. In this case, it is possible that the recognition portion 205a includes an infrared light emission device or an apparatus for strongly emitting visible light. Yet alternatively, the recognition portion 205a may be an indicator (a marker) having a special shape. As an example, the recognition portion 205a may have various shapes such as a spiral shape, an arrow shape, and a polygonal shape. It should be noted that the image capturing target member 205 and/or the recognition portion 205a correspond to an example of the detection target portion.

It should be noted that in the above exemplary embodiment, an example has been used where an operation is performed on the case 200 by pulling or loosening the string members 204 provided in the case 200 using the operation portions 250 or 260. Alternatively, operation means for moving the image capturing target members 205 in the case main body 201 by another operation method may be included. For example, using as an image capturing target member a part of a rod-like member inserted into the case 200, the position of the image capturing target member may be detected, or it may be detected whether or not the image capturing target member is present in the case 200. In this case, an operation is performed on the case 200 by the operation of changing the depth of insertion of the rod-like member inserted into the case 200, pulling out the rod-like member, or inserting back the rod-like member.

Figure 13:
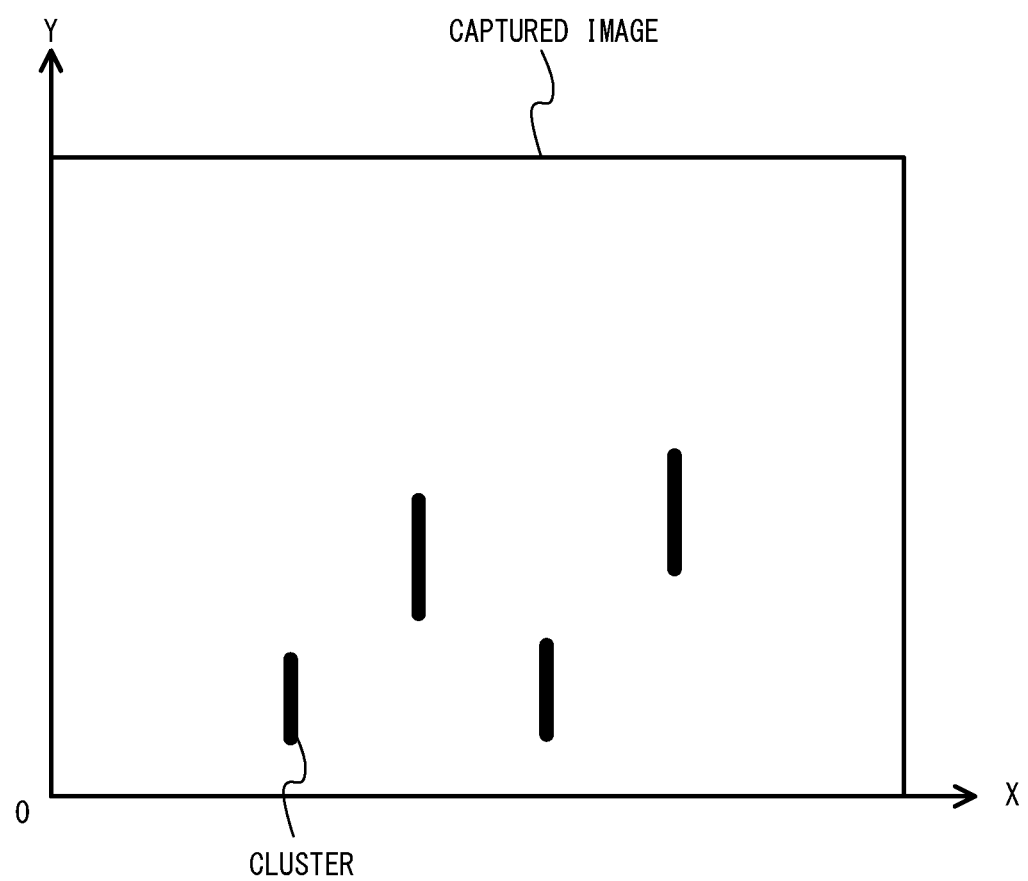
FIG. 13 is a diagram illustrating a non-limiting example of information of the image capturing target members calculated in a first mode (a clustering mode)
Figure 14:
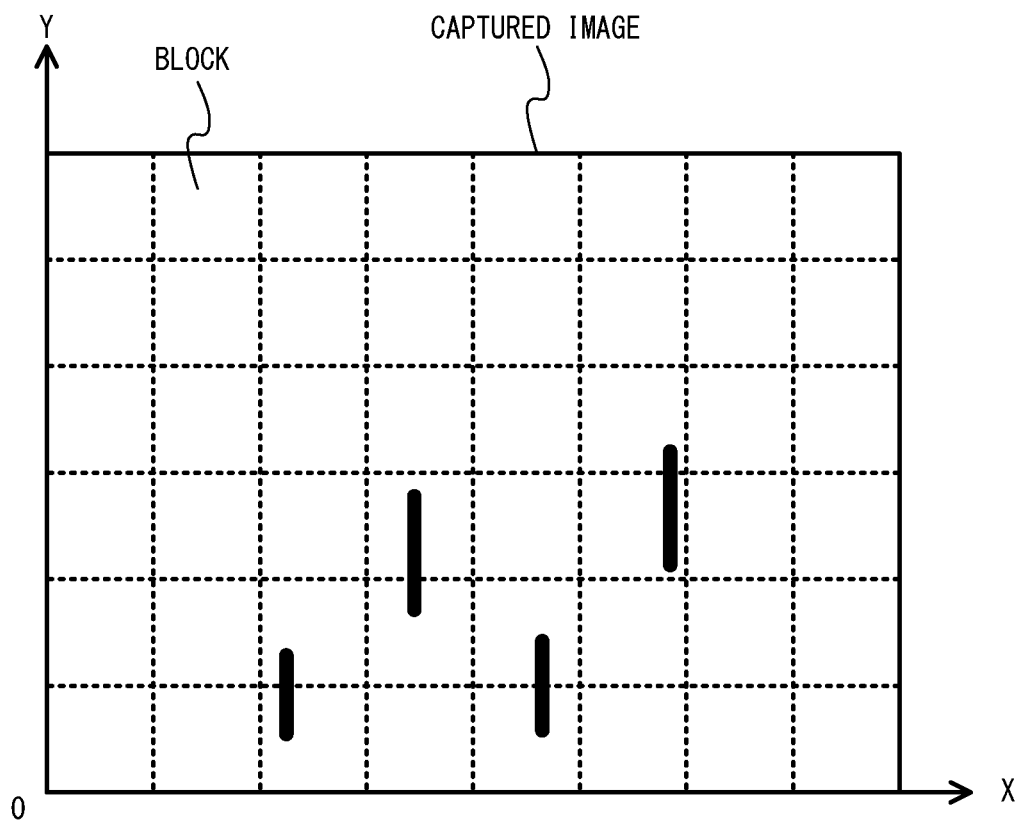
FIG. 14 is a diagram illustrating a non-limiting example of information of the image capturing target members calculated in a second mode (a moment mode)

Next, with reference to FIGS. 13 and 14, a description is given of information of the image capturing target members calculated from a captured image captured by the infrared image capturing section 123. It should be noted that FIG. 13 is a diagram illustrating an example of information of the image capturing target members calculated in a first mode (a clustering mode). FIG. 14 is a diagram illustrating an example of information of the image capturing target members calculated in a second mode (a moment mode).

In FIG. 13, in the first mode, a cluster of high-luminance pixels is detected from a captured image captured by the infrared image capturing section 123, and the position or the size of the cluster in the captured image is calculated. For example, as shown in FIG. 13, predetermined coordinate axes (e.g., coordinate axes including an X-axis in a horizontal direction and a Y-axis in a vertical direction) are set for the entirety of a captured image captured by the infrared image capturing section 123 or a partial region of a captured image (an analysis window described later) in which information is calculated from the captured image. Then, from the image for which the coordinate axes are set, a pixel group in which pixels having luminances equal to or greater than a predetermined threshold are adjacent to each other is extracted. Then, when the pixel group has a size within a predetermined range (a size equal to or greater than a first threshold and less than or equal to a second threshold), it is determined that the pixel group is a cluster. For example, in the case of a captured image obtained by capturing the slider portions 206 in the case 200, the recognition portions 205a reflecting more infrared light emitted from the infrared light-emitting section 124 are extracted as high-luminance pixels. Thus, the recognition portions 205a captured through the slits are determined as a cluster. Then, in the first mode, the total number of the thus extracted clusters is calculated, and the average luminance, the area (the number of pixels), the coordinates of the center of gravity, and the circumscribed rectangle of each cluster are also calculated. Then, these calculation results are calculated as information of the image capturing target members.

It should be noted that in the first mode, when the position (the coordinates of the center of gravity or the position of the circumscribed rectangle) of each cluster is calculated, the position may be calculated based on a reference position set in the captured image. As an example, the reference position may be set to the position of a predetermined image capturing target object captured in the captured image. Specifically, aside from the image capturing target members 205 (the recognition portions 205a), a reference marker having a shape determined in advance and composed of a material having retroreflective properties is provided at the position where a positional relationship with another image capturing target member 205 near the slider portion 206 (the position where the reference marker can be captured by the infrared image capturing section 123) is determined in advance. Then, the position of the reference marker functions as the reference position. Then, when the captured image captured by the infrared image capturing section 123 is analyzed, image processing or the like is performed on the captured image using pattern matching, thereby calculating from the captured image the position where the reference marker is captured. The position of each cluster is calculated based on the image capturing position of such a reference marker, whereby it is possible to detect the position, the direction, the shape, and the like of the cluster with high accuracy. Further, using the positional relationship between the reference marker captured in the captured image and another image capturing target member 205, or the shape of the captured reference marker, whereby it is easy to specify each of the image capturing target members 205. Further, the positional relationship and the shape of the reference marker are made unique to an extension operation device, whereby it is also possible to determine the type and the like of the extension operation device from the captured image captured by the infrared image capturing section 123.

In FIG. 14, in the second mode, a captured image captured by the infrared image capturing section 123 is divided into a plurality of blocks, and the average luminance and the position of the center of gravity of each block are calculated. For example, as shown in FIG. 14, predetermined coordinate axes (e.g., coordinate axes including an X-axis in a horizontal direction and a Y-axis in a vertical direction) are set for the entirety of a captured image captured by the infrared image capturing section 123 or a partial region of a captured image (an analysis window described later) in which information is calculated from the captured image. Further, the image for which the coordinate axes are set is divided into predetermined blocks (e.g., 8×6=48 blocks). Then, using pixels having luminances equal to or greater than a predetermined threshold in each block as processing targets, the sum of the luminances of each block, the primary moment in the horizontal direction of each block, and the primary moment in the vertical direction of each block are calculated. Then, these calculation results are calculated as information of the image capturing target members. For example, the sum of the luminances of each block is a value obtained by totaling the luminances of pixels in the block and is calculated regarding all the pixels. The sum of the luminances of each block is a parameter for obtaining the average luminance of the block by dividing this sum by the number of pixels in the block. Further, the primary moment in the horizontal direction of each block is a value obtained by totaling values obtained by multiplying the luminances of pixels in the block by the positions in the X-axis direction of the pixels and is calculated regarding all the pixels. The primary moment in the horizontal direction of each block is a parameter for obtaining the position of the center of gravity in the horizontal direction of the luminance of the block by dividing the primary moment in the horizontal direction of the block by the sum of the luminances of the block. Further, the primary moment in the vertical direction of each block is a value obtained by totaling values obtained by multiplying the luminances of pixels in the block by the positions in the Y-axis direction of the pixels and is calculated regarding all the pixels. The primary moment in the vertical direction of each block is a parameter for obtaining the position of the center of gravity in the vertical direction of the luminance of the block by dividing the primary moment in the vertical direction of the block by the sum of the luminances of the block.

It should be noted that the information of the image capturing target members in the first mode and the information of the image capturing target members in the second mode are calculated by the processing section 121 in the right controller 4 and transmitted to the main body apparatus 2. Thus, as compared with a case where data indicating a captured image itself captured by the infrared image capturing section 123 is transmitted, it is possible to reduce the amount of data to be transmitted to the main body apparatus 2, and it is also possible to reduce the processing load on the main body apparatus 2 side. Further, the amount of data of the information of the image capturing target members is small. Thus, it is also possible to transmit the information of the image capturing target members to the main body apparatus 2 by including the information in another operation data to be transmitted from the right controller 4. Thus, it is also possible to simply configure a communication process itself between the right controller 4 and the main body apparatus 2. It should be noted that the right controller 4 (the processing section 121) for calculating the information of the image capturing target members corresponds to an example of a detection section and a specifying section.

Figure 15:
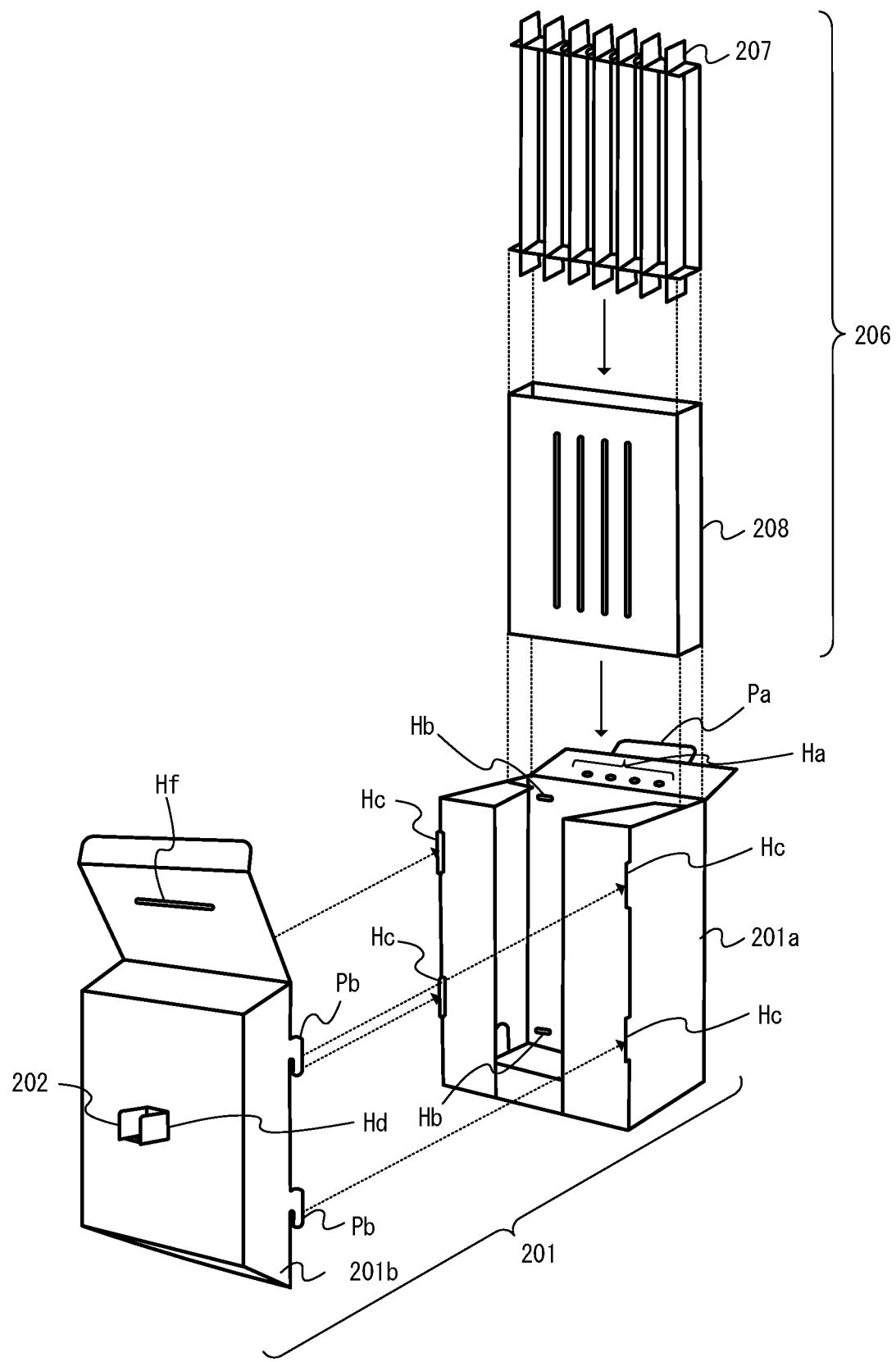
FIG. 15 is a diagram showing a non-limiting example of the combination of main components when the case 200 is assembled.

Next, with reference to FIG. 15, a method for assembling the case 200 is described. It should be noted that FIG. 15 is a diagram showing an example of the combination of main components when the case 200 is assembled.

In FIG. 15, all the components of the case 200 except for the string members 204 are formed by folding cardboard members. It should be noted that in FIG. 15, the shoulder belts 203, the string members 204, the image capturing target members 205, the operation portions 250, and the operation portions 260 are not illustrated. The slide portions 206 are assembled by inserting the partition portion 207 into an angular cylindrical member 208 in the state where the plurality of image capturing target members 205 to which the string members 204 are connected are placed on the lanes. Specifically, the partition portion 207 is assembled by inserting a plurality of partition plate members into a holding plate member in which a cut for each lane is generated. Each plate member is composed of a cardboard member. Further, the angular cylindrical member 208 is assembled by folding a plate member in which the slits are formed into an angular cylindrical shape that opens in the slide direction. The plate member is composed of a cardboard member.

It should be noted that in the exemplary embodiment, each cardboard member may be a single plate member having a stack structure or a plurality of plate members bonded together. For example, the cardboard member may be a so-called corrugated cardboard member, which is formed by bonding a plate-like paper sheet to one surface or both of two surfaces of a corrugated plate-like paper sheet.

Further, in the front side main body 201a and the back side main body 201b, four insertion pieces Pb included in the back side main body 201b are caused to fit four insertion holes Hc formed in the front side main body 201a, thereby assembling the case main body 201 before the slide portions 206 are installed.

The front side main body 201a is assembled by folding a plate member in which a plurality of pass-through holes Ha through which the string members 204 are to pass, four attachment holes Hb to which the shoulder belts 203 are to be attached, the four insertion holes Hc into which the four insertion pieces Pb included in the back side main body 201b are to be inserted, an insertion piece Pa to be inserted into an insertion hole Hf formed in the back side main body 201b, and the like are formed. Specifically, the plate member is composed of a cardboard member. The cardboard member is folded into an approximately hexahedral shape of which a rear surface partially opens, thereby assembling the front side main body 201a.

The back side main body 201b is assembled by folding a plate member in which the four insertion pieces Pb to be inserted into the four insertion holes Hc formed in the front side main body 201a, the insertion hole Hf into which the insertion piece Pa included in the front side main body 201a is to be inserted, an insertion provision hole Hd in which the controller placement portion 202 is to be provided in an inserted manner, and the like are formed. Specifically, the plate member is composed of a cardboard member. Then, in a part of the cardboard member, a cut-out region for forming the controller placement portion 202 by cutting out and folding the cardboard member is formed. The controller placement portion 202 is formed in the back side main body 201b by causing the cardboard member in the cut-out region to pass through the insertion provision hole Hd in the state where the cardboard member in the cut-out region is folded into an angular cylindrical shape. Then, the cardboard member is folded into an approximately hexahedral shape in the state where the controller placement portion 202 is formed, thereby assembling the back side main body 201b.

To the four attachment holes Hb of the thus assembled case main body 201, the shoulder belts 203 are attached. Then, in the state where an upper surface of the case main body 201 is open, the slide portions 206 are installed in the inner space on the front surface side of the case main body 201. Then, in the state where the string members 204 pass through the pass-through holes Ha, the upper surface of the case main body 201 is closed so as to cause the insertion piece Pa included in the front side main body 201a to fit the insertion hole Hf formed in the back side main body 201b, thereby assembling the case 200.

As described above, the case 200 is formed by combining components assembled by folding cardboard members. Thus, it is possible to achieve an extension operation device to be assembled by the user in the state where a group of plate-like members is a product form. Further, as described above, the extension operation device does not need to have an electrical structure such as an electronic circuit for detecting the content of an operation performed by the user, or transmitting the detection result to the main body apparatus 2, and therefore can be achieved as the above product to be assembled by the user.

For folding the cardboard member to form a three-dimensional shape, the surfaces may be bonded together by any method. For example, the sides of the surfaces may be bonded together by an adhesive tape. An insertion tab may be formed on one of the sides, and an insertion hole may be formed in the other side, so that the insertion tab may be inserted into the insertion hole. The sides of the surfaces may be bonded together by an adhesive agent. In the above-described embodiment, the components of the case 200 are each formed of a cardboard member. Alternatively, at least a part of these components may be a thin paper sheet or another type of plate member. For example, at least a part of these components may be assembled by folding a resinous, wooden or metallic thin or thick plate member, or the shoulder belts 203 may be formed of strip-like fiber members. A part of these components may be combined with a component of a different material. For example, the holes through which the string members 204 pass can be scraped or worn by the movements of the string members 204. Thus, a ring member or a sheet member made of resin or the like can be used in a portion of each of the holes that come into contact with the string members 204. At least parts of the components may be provided in advance as a polyhedron component. Further, at least parts of the components may be formed as a polyhedron component in advance.

Further, the headwear 300 (see FIG. 8) may be assembled as a head-wearable member like a helmet or a hat by folding cardboard members as in the case 200. Then, in the headwear 300, an insertion hole is provided, through which the left controller 3 is vertically inserted from above in the negative y-axis direction such that a lower surface (a surface formed further in the negative y-axis direction shown in FIG. 4) of the left controller 3 is directed downward, and which can fix the left controller 3 such that a main surface (a surface formed further in a negative z-axis direction shown in FIG. 4) of the left controller 3 is directed in the left direction of the head of the user. Thus, when the user wears on their head the headwear 300 in which the left controller 3 is inserted and fixed in the vertical direction, the direction from the neck to the head of the user is a positive y-axis direction of the left controller 3, and the left direction of the head of the user is the negative z-axis direction. Thus, based on the detection results of the inertial sensors of the left controller 3, it is possible to estimate the direction in which the head of the user leans. It should be noted that the headwear 300 may be formed as a product included in a set with the case 200, and may be configured to be assembled by the user.

Figure 16:
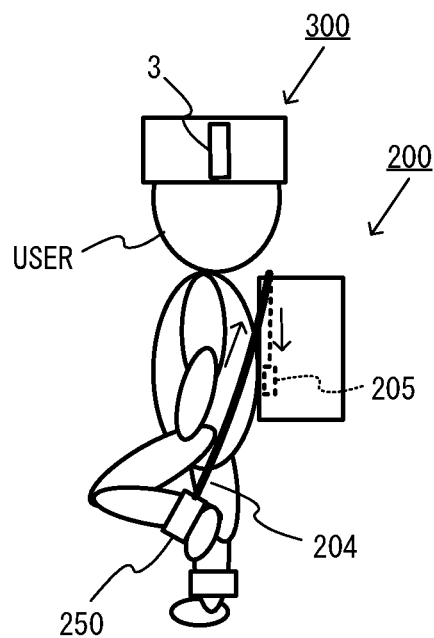
FIG. 16 is a diagram showing a non-limiting example of the state where the user wearing the case 200 and the headwear 300 lifts their left leg.
Figure 17:
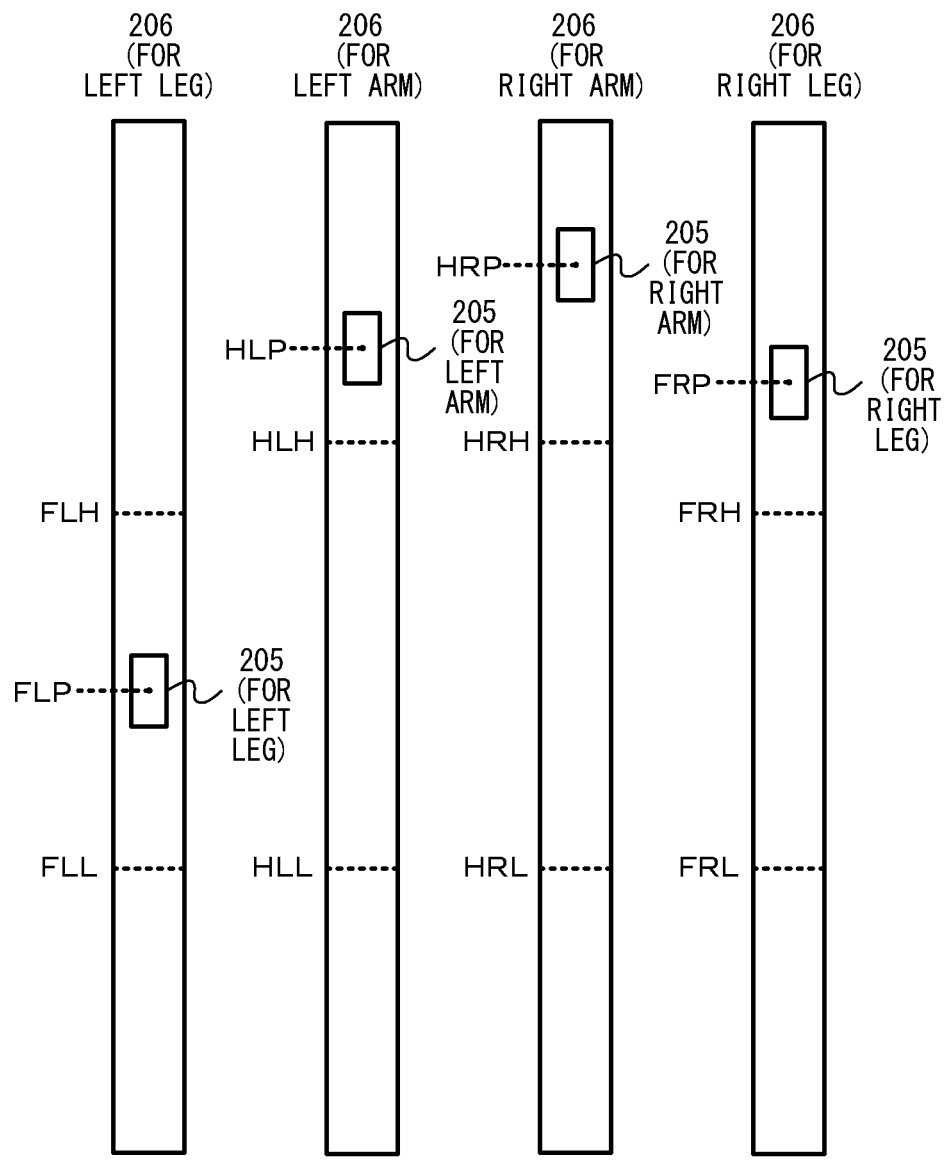
FIG. 17 is a diagram showing non-limiting examples of the motions of the image capturing target members 205 in a case where the user lifts their left leg.
Figure 18:
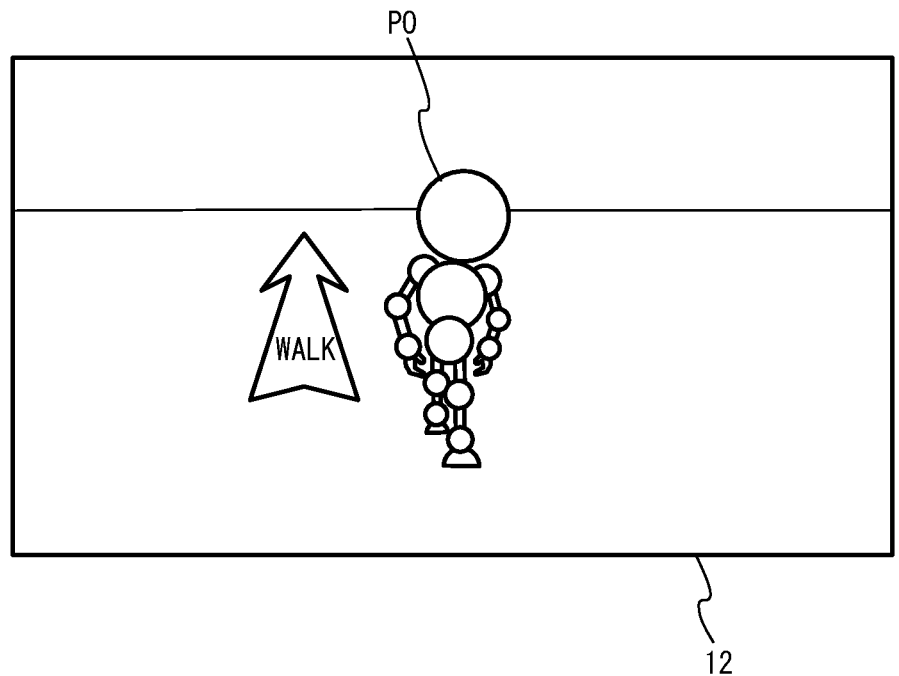
FIG. 18 is a diagram showing a non-limiting example of the action of a player object PO in a case where the user lifts their left leg.

Next, with reference to FIGS. 16 to 18, a description is given of processing in a case where the user wearing the case 200 and the headwear 300 lifts their leg. It should be noted that FIG. 16 is a diagram showing an example of the state where the user wearing the case 200 and the headwear 300 lifts their left leg. FIG. 17 is a diagram showing examples of the motions of the image capturing target members 205 in a case where the user lifts their left leg. FIG. 18 is a diagram showing an example of the action of the player object PO in a case where the user lifts their left leg.

In FIG. 16, in a case where the user wearing the case 200 and the headwear 300 lifts their left leg, the operation portion 250 attached to the left leg moves upward with the rise of the left leg, and the string member 204, one end of which is connected to the operation portion 250, loosens. Thus, when the length of each string member 204 is adjusted so that in the state where the user lowers their leg, the image capturing target member 205 corresponding to the leg is placed in an upper portion of the slide portion 206, the image capturing target member 205 connected to the other end of the string member 204 having loosened by the user lifting the left leg falls downward along the slide portion 206 (the direction of an arrow shown in FIG. 16).

In FIG. 17, for each of paths along which the plurality of image capturing target members 205 move in a sliding manner, thresholds for determining the position of the image capturing target member 205 are set. For example, the image capturing target member 205 for the left leg, which rises and falls in accordance with the action of the left leg, moves in a sliding manner along the slide member 206 for the left leg, and an upper limit threshold FLH and a lower limit threshold FLL are set for this slide movement. Then, it is determined whether or not a position FLP of the image capturing target member 205 for the left leg (e.g., the position of the center of gravity of the recognition portion 205a included in the image capturing target member 205 for the left leg) is above the upper limit threshold FLH, or whether or not the position FLP is within the range between the upper limit threshold FLH and the lower limit threshold FLL, or whether or not the position FLP is below the lower limit threshold FLL, thereby estimating the action of the left leg of the user. As an example, the upper limit threshold FLH=170 and the lower limit threshold FLL=100 are set. When the position FLP of the image capturing target member 205 has a value greater than 170, it is determined that the left leg of the user is lowered. When the position FLP of the image capturing target member 205 is in the range of 100 to 170, it is determined that the left leg of the user is lifted. When the position FLP of the image capturing target member 205 has a value smaller than 100, it is determined that the left leg of the user is lifted at a maximum. It should be noted that when the position FLP of the image capturing target member 205 has a value smaller than 100, it may be determined that the current state is the state where the position FLP has an abnormal value, thereby determining an error. Alternatively, the lower limit threshold FLL may be changed to the same value as the value of the position FLP or a value between the lower limit threshold FLL and the value of the position FLP.

The thresholds for determining the position of the image capturing target member 205 may be further subdivided. For example, in addition to the upper limit threshold FLH=170 and the lower limit threshold FLL=100, an upper limit proximity determination value=163 (10% below the upper limit in the above range) and a middle determination value=135 (the center of the above range) are set. In this case, when the position FLP of the image capturing target member 205 has a value greater than 170, it may be determined that the current state is the state where the left leg of the user is lowered. When the position FLP of the image capturing target member 205 is in the range of 163 to 170, it may be determined that the current state is a preparation state where the left leg of the user is about to be lifted. When the position FLP of the image capturing target member 205 is in the range of 135 to 163, it may be determined that the current state is the state where the left leg of the user is lifted by a small amount (a small stride state). When the position FLP of the image capturing target member 205 is in the range of 100 to 135, it may be determined the current state is the state where the left leg of the user is lifted by a large amount (a large stride state). When the position FLP of the image capturing target member 205 has a value smaller than 100, it may be determined that the current state is the state where the left leg of the user is lifted at a maximum.

Further, similarly to the image capturing target member 205 for the left leg, also for each of the image capturing target member 205 for the right leg, the image capturing target member 205 for the left arm, and the image capturing target member 205 for the right arm, thresholds for determining the position of the image capturing target member 205 are set. For example, the image capturing target member 205 for the right leg, which rises and falls in accordance with the action of the right leg, moves in a sliding manner along the slide member 206 for the right leg, and an upper limit threshold FRH (e.g., FRH=170) and a lower limit threshold FRL (e.g., FRL=100) are set for this slide movement. Then, it is determined whether or not the position FRP of the image capturing target member 205 for the right leg is above the upper limit threshold FRH, or whether or not the position FRP is within the range between the upper limit threshold FRH and the lower limit threshold FRL, or whether or not the position FRP is below the lower limit threshold FRL, thereby estimating the action of the right leg of the user (whether or not the right leg is lifted, and the height of the right leg). Further, the image capturing target member 205 for the left arm, which rises and falls in accordance with the action of the left arm, moves in a sliding manner along the slide member 206 for the left arm, and an upper limit threshold HLH (e.g., HLH=220) and a lower limit threshold HLL (e.g., HLL=100) are set for this slide movement. Then, it is determined whether or not the position HLP of the image capturing target member 205 for the left arm is above the upper limit threshold HLH, or whether or not the position HLP is within the range between the upper limit threshold HLH and the lower limit threshold HLL, or whether or not the position HLP is below the lower limit threshold HLL, thereby estimating the action of the left arm of the user (whether or not the left arm is stretched, and the distance from the left arm). Then, the image capturing target member 205 for the right arm, which rises and falls in accordance with the action of the right arm, moves in a sliding manner along the slide member 206 for the right arm, and an upper limit threshold HRH (e.g., HRH=220) and a lower limit threshold HRL (e.g., HRL=100) are set for this slide movement. Then, it is determined whether or not the position HRP of the image capturing target member 205 for the right arm is above the upper limit threshold HRH, or whether or not the position HRP is within the range between the upper limit threshold HRH and the lower limit threshold HRL, or whether the position HRP is below the lower limit threshold HRL, thereby estimating the action of the right arm of the user (whether or not the right arm is stretched, and the distance from the right arm).

Then, as shown in FIG. 18, based on the actions of both legs and both arms of the user estimated in accordance with the positions of the image capturing target members 205, the player object PO is caused to perform an action, and the virtual space in which the player object PO is displayed is displayed on the display screen (e.g., the display 12). For example, when it is estimated based on the position FLP of the image capturing target member 205 for the left leg that the user lifts their left leg, the player object PO is caused to perform the action of walking by stepping its left leg forward, and the state where the player object PO walks by stepping its left leg forward in the virtual space is displayed on the display 12. It should be noted that the length at which the player object PO steps its left leg forward and the height at which the player object PO lifts its left leg may be changed in accordance with whether the left leg of the user is in a small stride state or a large stride state, or may be changed in accordance with the value of the position FLP of the image capturing target member 205 for the left leg.

Figure 19:
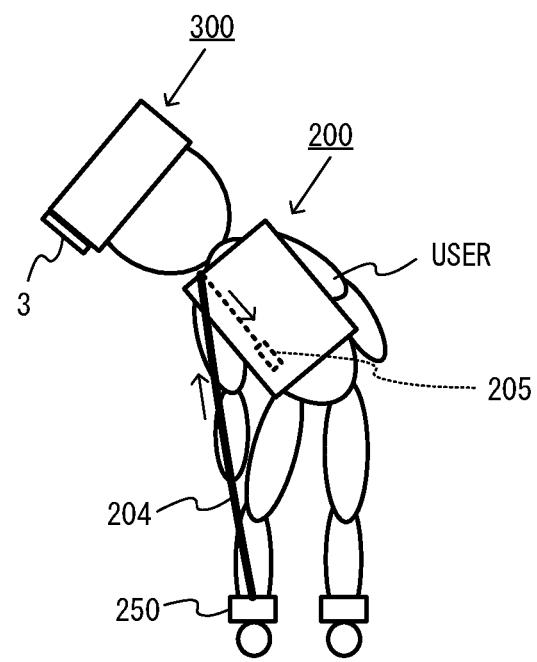
FIG. 19 is a diagram showing a non-limiting example of the state where the user wearing the case 200 and the headwear 300 tilts their body to the left.
Figure 20:
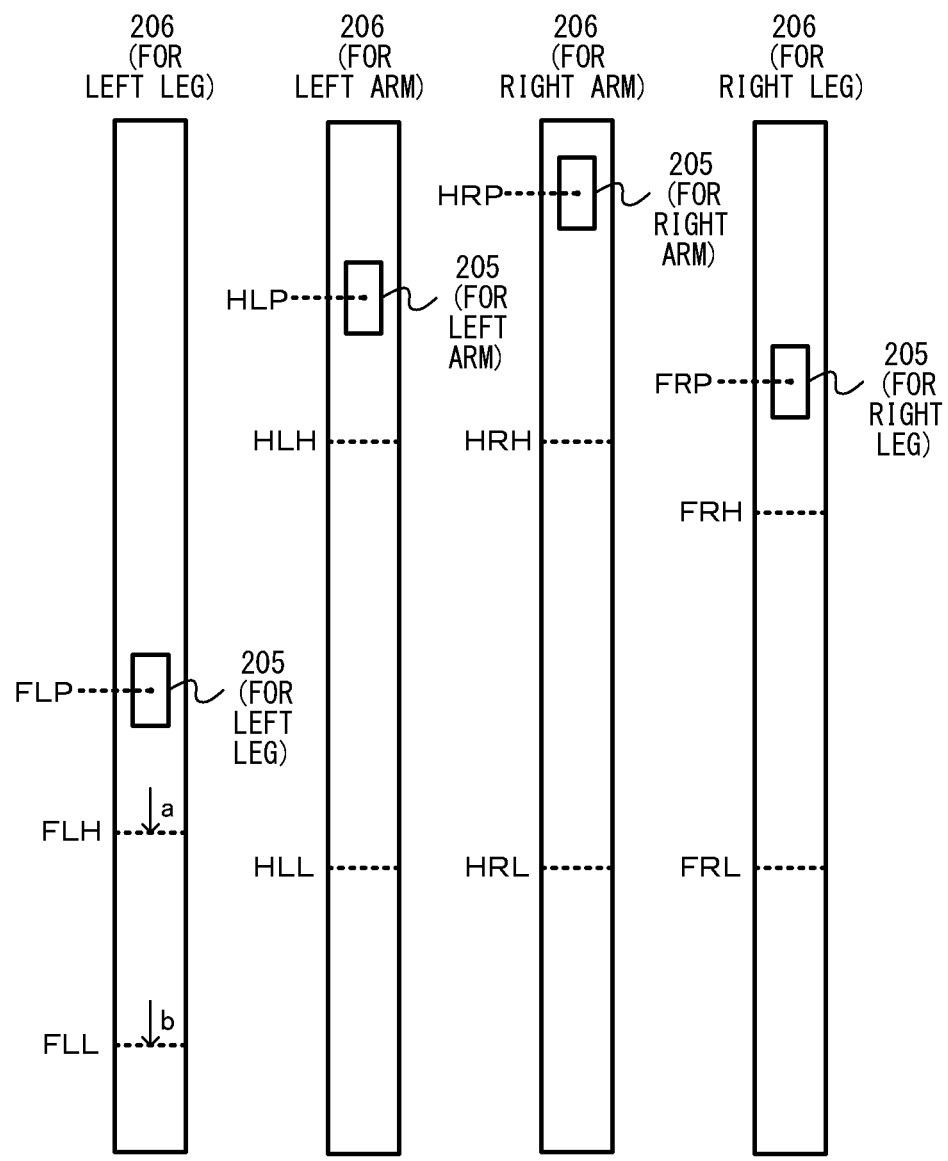
FIG. 20 is a diagram showing non-limiting examples of the motions of the image capturing target members 205 in a case where the user tilts their body to the left.
Figure 21:
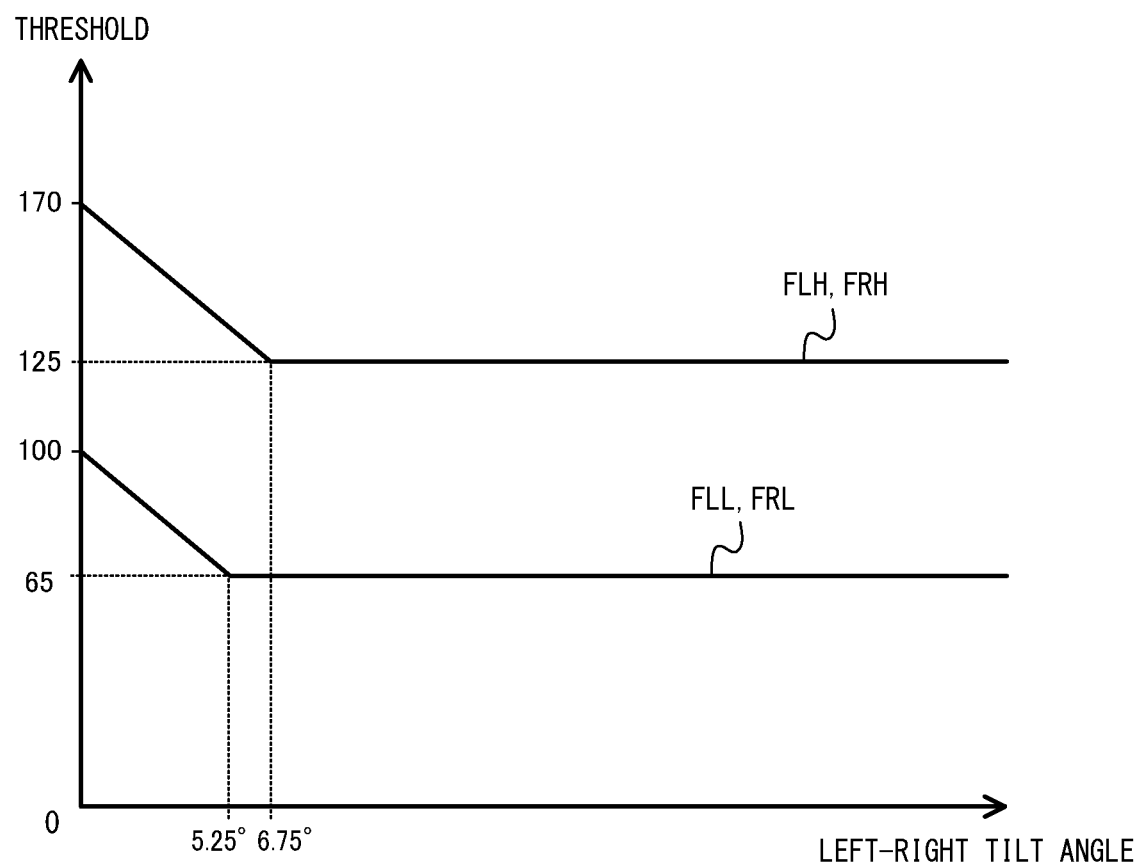
FIG. 21 is a diagram showing a non-limiting example of a threshold correction process performed in a case where the user tilts their body to the left.
Figure 22:
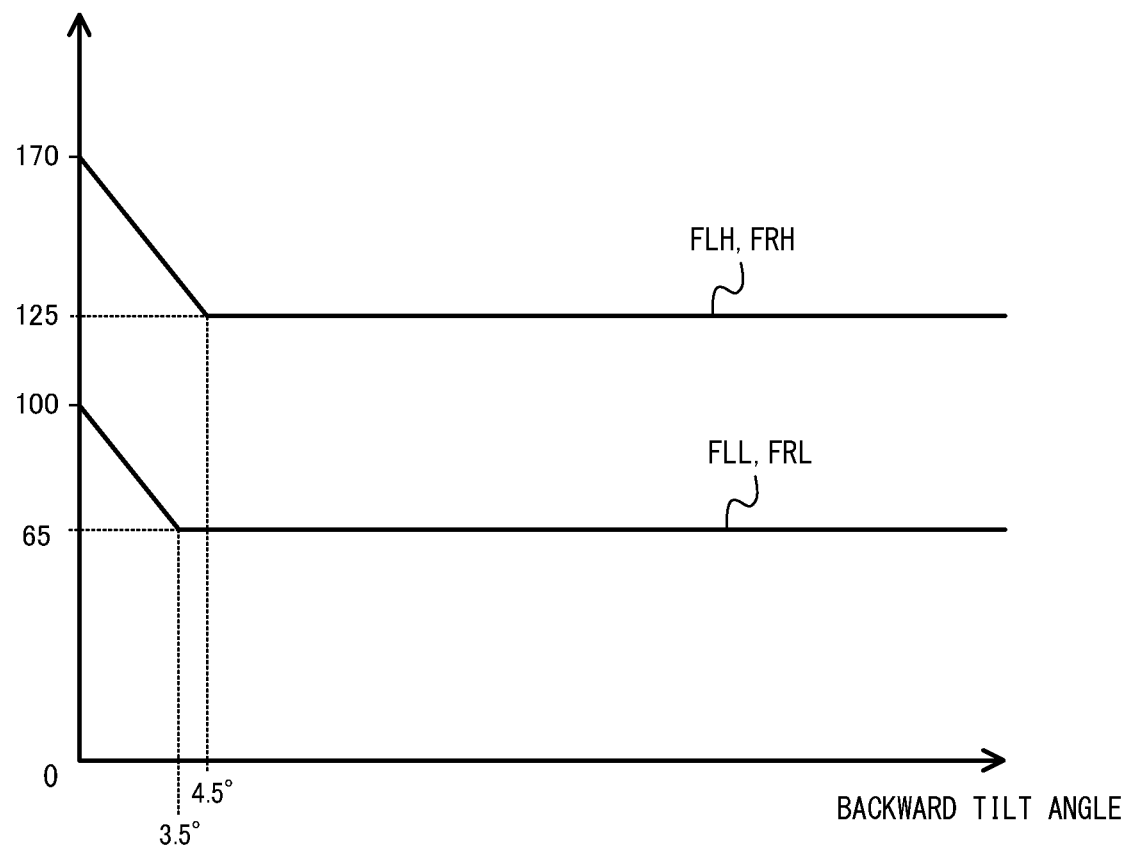
FIG. 22 is a diagram showing a non-limiting example of a threshold correction process performed in a case where the user tilts their body backward.
Figure 23:
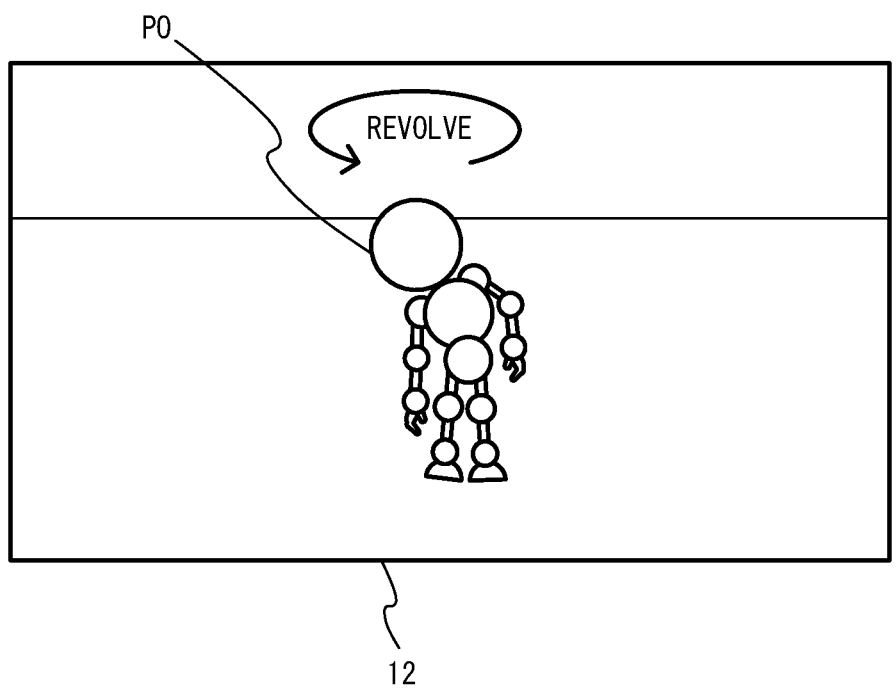
FIG. 23 is a diagram showing a non-limiting example of the action of the player object PO in a case where the user tilts their body to the left.

Next, with reference to FIGS. 19 to 23, a description is given of processing in a case where the user wearing the case 200 and the headwear 300 tilts their body. It should be noted that FIG. 19 is a diagram showing an example of the state where the user wearing the case 200 and the headwear 300 tilts their body to the left. FIG. 20 is a diagram showing examples of the motions of the image capturing target members 205 in a case where the user tilts their body to the left. FIG. 21 is a diagram showing an example of a threshold correction process performed in a case where the user tilts their body to the left. FIG. 22 is a diagram showing an example of a threshold correction process in a case where the user tilts their body backward. FIG. 23 is a diagram showing an example of the action of the player object PO in a case where the user tilts their body to the left.

In FIG. 19, when the user wearing the case 200 and the headwear 300 tilts their body to the left, each of the case 200 and the headwear 300 tilts to the left. Thus, each of the right controller 4 fixed to the case 200 and the left controller 3 fixed to the headwear 300 is also tilted to the left. Thus, the detection results of the inertial sensors of the right controller 4 and/or the inertial sensors of the left controller 3 are analyzed, whereby it can be estimated that the user tilts their body to the left.

On the other hand, when the case 200 tilts to the left, the string member 204, one end of which is connected to the operation portion 250 attached to the left leg of the user, also loosens. Thus, the image capturing target member 205 for the left leg connected to the other end of the string member 204 having loosened by the user tilting their body to the left falls downward along the slide portion 206 (the direction of an arrow shown in FIG. 19). That is, also when the user tilts their body to the left, the image capturing target member 205 for the left leg falls downward similarly to a case where the user lifts their left leg. Thus, when the process of estimating the action of the left leg of the user using the upper limit threshold FLH and the lower limit threshold FLL set for the slide movement of the image capturing target member 205 for the left leg is performed, it is possible that even in the state where the user lifts their left leg, it is erroneously determined that the user lifts their left leg. As described above, when the position of each image capturing target member 205 is determined using a fixed threshold, it is possible that a user action cannot be accurately detected.

In the exemplary embodiment, in accordance with the orientation of the user wearing the case 200, i.e., the orientation of the right controller 4 based on the detection results of the inertial sensors of the right controller 4, the thresholds (the ranges) for determining the positions of the image capturing target members 205 are corrected. Specifically, in the exemplary embodiment, when the user wearing the case 200 tilts to the left, a correction is made so as to lower each of the upper limit threshold FLH and the lower limit threshold FLL for determining the position of the image capturing target member 205 for the left leg. Further, in the exemplary embodiment, when the user wearing the case 200 tilts to the right, a correction is made so as to lower each of the upper limit threshold FRH and the lower limit threshold FRL for determining the position of the image capturing target member 205 for the right leg. Further, in the exemplary embodiment, when the user wearing the case 200 tilts backward, a correction is made so as to lower each of the upper limit threshold FLH and the lower limit threshold FLL for determining the position of the image capturing target member 205 for the left leg and the upper limit threshold FRH and the lower limit threshold FRL for determining the position of the image capturing target member 205 for the right leg. Then, when the user wearing the case 200 returns to the state where the user is not tilted to the left, to the right, or backward (e.g., the tilt of the user returns to the vertical direction), each threshold is returned to the above initial value.

For example, as shown in FIG. 20, when the user wearing the case 200 tilts to the left, a correction is made so as to lower the upper limit threshold FLH for determining the position FLP of the image capturing target member 205 for the left leg in a direction a illustrated in FIG. 20 by a correction amount corresponding to the tilt, and lower the lower limit threshold FLL in a direction b illustrated in FIG. 20 by a correction amount corresponding to the tilt. As described above, even when the value of the position FLP of the image capturing target member 205 for the left leg is smaller than the initial value of the upper limit threshold FLH (e.g., FLH=170) due to the fact that the user wearing the case 200 tilts to the left, a correction is made so as to lower each of the upper limit threshold FLH and the lower limit threshold FLL, whereby the position FLP has a value greater than the corrected upper limit threshold FLH. Thus, even when the image capturing target member 205 for the left leg falls due to the fact that the user wearing the case 200 tilts to the left, it is possible to prevent the situation where it is determined, based on the fall, that the user lifts their left leg. As described above, in accordance with the orientation of the user wearing the case 200, i.e., the orientation of the right controller 4 based on the detection results of the inertial sensors of the right controller 4, the thresholds for determining the position of the image capturing target member 205 are corrected, whereby it is possible to accurately detect a user action. That is, when a user operation for pulling out or loosening the string member 204 is detected, and in a case where the string member 204 similarly moves by a user action (e.g., tilting their body) different from the user operation, it is difficult to distinguish between the user operation and the user action. Thus, it is necessary to correct the thresholds to accurately make the distinction.

As shown in FIG. 21, when the user wearing the case 200 tilts to the left or right, then in accordance with the tilt angle, each of the upper limit threshold FLH and the lower limit threshold FLL for the left leg and the upper limit threshold FRH and the lower limit threshold FRL for the right leg is corrected. As an example, when the user wearing the case 200 tilts to the left, a correction is made so as to maintain each of the upper limit threshold FRH and the lower limit threshold FRL for the right leg at the initial value, and lower each of the upper limit threshold FLH and the lower limit threshold FLL for the left leg by a threshold correction amount corresponding to the tilt angle shown in FIG. 21. Further, when the user wearing the case 200 tilts to the right, a correction is made so as to maintain each of the upper limit threshold FLH and the lower limit threshold FLL for the left leg at the initial value, and lower each of the upper limit threshold FRH and the lower limit threshold FRL for the right leg by a threshold correction amount corresponding to the tilt angle shown in FIG. 21.

For example, when the user wearing the case 200 tilts to the left, a correction is made so as to, based on a function in which a correction amount of about 6.67 increases with respect to an inclination angle of 1° of the tilt to the left, lower each of the upper limit threshold FLH and the lower limit threshold FLL for the left leg. Then, when each threshold reaches its correction limit (e.g., the correction limit of the upper limit threshold FLH is 125 (a correction amount of 45), and the correction limit of the lower limit threshold FLL is 65 (a correction amount of 35)), the upper limit threshold FLH or the lower limit threshold FLL having reached the correction limit is not corrected. Thus, in a case where the lower limit threshold FLL reaches the correction limit earlier in the correction process, the range between the upper limit threshold FLH and the lower limit threshold FLL has a minimum width in the state where both the upper limit threshold FLH and the lower limit threshold FLL reach the correction limits. For example, in the above example, the range between the upper limit threshold FLH and the lower limit threshold FLL is 70 in the initial state before the correction and is reduced to a minimum width of 60 by making the above correction.

Further, when the user wearing the case 200 tilts to the right, then similarly to a case where the user tilts to the left, a correction is made so as to, based on a function in which a correction amount of about 6.67 increases with respect to an inclination angle of 1° of the tilt to the right, lower each of the upper limit threshold FRH and the lower limit threshold FRL for the right leg. Then, when each threshold reaches its correction limit (e.g., the correction limit of the upper limit threshold FRH is 125 (a correction amount of 45), and the correction limit of the lower limit threshold FRL is 65 (a correction amount of 35)), the upper limit threshold FRH or the lower limit threshold FRL having reached the correction limit is not corrected. Thus, in a case where the lower limit threshold FRL reaches the correction limit earlier in the correction process, the range between the upper limit threshold FRH and the lower limit threshold FRL also has a minimum width in the state where both the upper limit threshold FRH and the lower limit threshold FRL reach the correction limits. For example, in the above example, the range between the upper limit threshold FRH and the lower limit threshold FRL is 70 in the initial state before the correction and is reduced to a minimum width of 60 by making the above correction.

As shown in FIG. 22, when the user wearing the case 200 tilts backward, then in accordance with the backward tilt angle, all of the upper limit threshold FLH and the lower limit threshold FLL for the left leg and the upper limit threshold FRH and the lower limit threshold FRL for the right leg are corrected. As an example, when the user wearing the case 200 tilts backward, a correction is made so as to lower each of the upper limit threshold FLH and the lower limit threshold FLL for the left leg and the upper limit threshold FRH and the lower limit threshold FRL for the right leg by a threshold correction amount corresponding to the backward tilt angle shown in FIG. 22.

For example, when the user wearing the case 200 tilts backward, a correction is made so as to, based on a function in which a correction amount of about 10.0 increases with respect to 1° of the backward tilt angle, lower each of the upper limit threshold FLH and the lower limit threshold FLL for the left leg and the upper limit threshold FRH and the lower limit threshold FRL for the right leg. Then, when each threshold reaches its correction limit (e.g., the correction limits of the upper limit thresholds FLH and FRH are 125 (a correction amount of 45), and the correction limits of the lower limit thresholds FLL and FRL are 65 (a correction amount of 35)), the threshold having reached the correction limit is not corrected. Thus, also in a case where the user wearing the case 200 tilts backward, and in a case where the lower limit threshold FLL reaches the correction limit earlier in the correction process, the range between the upper limit threshold FLH and the lower limit threshold FLL has a minimum width in the state where both the upper limit threshold FLH and the lower limit threshold FLL reach the correction limits. For example, in the above example, the range between the upper limit threshold FLH and the lower limit threshold FLL is 70 in the initial state before the correction and is reduced to a minimum width of 60 by making the above correction. Further, in a case where the lower limit threshold FRL reaches the correction limit earlier in the correction process, the range between the upper limit threshold FRH and the lower limit threshold FRL also has a minimum width in the state where both the upper limit threshold FRH and the lower limit threshold FRL reach the correction limits. For example, in the above example, the range between the upper limit threshold FRH and the lower limit threshold FRL is 70 in the initial state before the correction and is reduced to a minimum width of 60 by making the above correction.

It should be noted that when the tilt of the user wearing the case 200 is returned so as to come close to the vertical direction, each threshold is returned to the above initial value. However, when the threshold returns to the initial value faster than the image capturing target member 205 returning to the normal position, it is possible that an erroneous determination is temporarily made. Thus, when each threshold is returned to the above initial value, then based on a predetermined coefficient, the threshold may be changed at a speed slower than the speed at which the tilt of the user returns. As an example, when a threshold correction amount becomes small, the threshold correction amount may be changed using a value obtained by multiplying the amount by which the threshold correction amount decreases by a coefficient (e.g., 0.08) less than or equal to 1.

Further, the direction in which the case 200 worn by the user in real space is tilted can be determined, for example, based on the direction of a gravitational acceleration. As an example, the values of accelerations detected by the acceleration sensor 114 provided in the right controller 4 are analyzed, whereby it is possible to calculate the direction of a gravitational acceleration using any method. The orientation of the right controller 4 based on the direction of the gravitational acceleration is calculated, whereby it is possible to estimate the direction in which the case 200 is tilted in real space. However, the direction in which the case 200 worn by the user is tilted in real space may be calculated using not only this method but also another method.

Further, in a case where a tilt to the left or right and a backward tilt simultaneously occur, such as a case where the user wearing the case 200 tilts to the left and backward or a case where the user wearing the case 200 tilts to the right and backward, the largest correction amounts may be selected, and the above thresholds may be corrected. Alternatively, the smallest correction amounts may be selected, and the above thresholds may be corrected. Yet alternatively, the above thresholds may be corrected using the average value or the added value of two calculated threshold correction amounts. Further, in the above correction, when the user wearing the case 200 tilts forward, each threshold is not corrected. Alternatively, in accordance with the forward tilt angle, each threshold may be corrected. Further, in the above description, an example has been used where the thresholds for determining the positions of the image capturing target members 205 for the left leg and the right leg are corrected. Alternatively, in accordance with the tilt and the like of the user wearing the case 200, the thresholds for determining the position of the image capturing target member 205 for the left arm or the right arm may be corrected.

Further, in the above threshold correction process, a correction limit is provided for a threshold itself or a correction amount. Alternatively, a correction limit may be provided using another method. For example, the maximum inclination angle of the case 200 for correcting the thresholds may be set, and the tilt of the case 200 equal to or greater than the maximum inclination angle may be corrected by the correction amount of the maximum inclination angle. As an example, the maximum inclination angle may be set to 30° in a case where the user wearing the case 200 tilts to the left or right, and when the user wearing the case 200 tilts to the left or right at an inclination angle greater than 30°, each threshold may be corrected using a threshold correction amount corresponding to the maximum inclination angle. Further, the maximum backward tilt angle may be set to 20° in a case where the user wearing the case 200 tilts backward, and when the user wearing the case 200 tilts backward at a backward tilt angle greater than 20°, each threshold may be corrected using a threshold correction amount corresponding to the maximum backward tilt angle.

Further, in the above threshold correction process, a plurality of correction limits may be combined together. For example, when the above correction limit provided for a threshold itself or a correction amount and the correction limit provided for an inclination angle are combined together, it is possible that either one of the correction limits is employed as an upper limit threshold, and the other correction limit is employed as a lower limit threshold.

Further, in the above description, an example has been used where, when the user wearing the case 200 tilts to the left, to the right, or backward, then in accordance with the inclination angle, each threshold is corrected in the direction in which it is less likely that it is determined that the leg is lifted. Alternatively, each threshold may be corrected in another direction. For example, depending on the action of the user to be detected, it is possible that in accordance with the tilt of the user wearing the case 200, each threshold is corrected in the direction in which it is likely that it is determined that the leg is lifted. Further, even when the user wearing the case 200 tilts to the left, to the right, and/or backward, the range may be provided in which each threshold is not corrected in any direction in accordance with the inclination angle.

Further, in the above description, an example has been used where when the user wearing the case 200 tilts to the left, each of the upper limit threshold FRH and the lower limit threshold FRL for the right leg is maintained at the initial value, and when the user wearing the case 200 tilts to the right, each of the upper limit threshold FLH and the lower limit threshold FLL for the left leg is maintained at the initial value, and each threshold is not corrected. Alternatively, an example is also possible where these thresholds are corrected. For example, it is possible that when the user wearing the case 200 tilts to the left, a correction is made so as to lower each of the upper limit threshold FLH and the lower limit threshold FLL for the left leg as in the above description, thereby correcting the current state to the state where it is less likely that it is determined that the left leg is lifted, and also a correction is made so as to raise each of the upper limit threshold FRH and the lower limit threshold FRL for the right leg, thereby correcting the current state to the state where it is likely that it is determined that the right leg is lifted. Further, it is possible that when the user wearing the case 200 tilts to the right, a correction is made so as to lower each of the upper limit threshold FRH and the lower limit threshold FRL for the right leg as in the above description, thereby correcting the current state to the state where it is less likely that it is determined that the right leg is lifted, and also a correction is made so as to raise the upper limit threshold FLH and the lower limit threshold FLL for the left leg, thereby correcting the current state to the state where it is likely that it is determined that the left leg is lifted.

As described above, when the user wearing the case 200 and the headwear 300 tilts their body to the left, to the right, or backward, thresholds are corrected to prevent an erroneous determination that the leg is lifted. Thus, the detection results of the inertial sensors of the right controller 4 and/or the inertial sensors of the left controller 3 are analyzed, whereby it is possible to accurately perform the process in which the user controls the action of the player object PO in accordance with the tilt of the body of the user. For example, as shown in FIG. 23, based on the detection results of the inertial sensors of the right controller 4 and/or the inertial sensors of the left controller 3, the player object PO is caused to perform an action, and the virtual space in which the player object PO is displayed is displayed on the display screen (e.g., the display 12). For example, when it is estimated based on the detection results of the inertial sensors of the right controller 4 and/or the inertial sensors of the left controller 3 that the user is tilted to the left, the player object PO is caused to perform the action of revolving to the left while being tilted to the left, and the state where the player object PO revolves to the left while being tilted to the left in the virtual space is displayed on the display 12. It should be noted that the velocity at which the player object PO revolves to the left and the angle at which the player object PO is tilted to the left may be changed in accordance with both (e.g., the average value, the added value, and the difference value) of the tilt of the case 200 estimated by the inertial sensors of the right controller 4 and the tilt of the headwear 300 estimated by the inertial sensors of the left controller 3, or may be changed in accordance with either one of the tilts.

Figure 25:
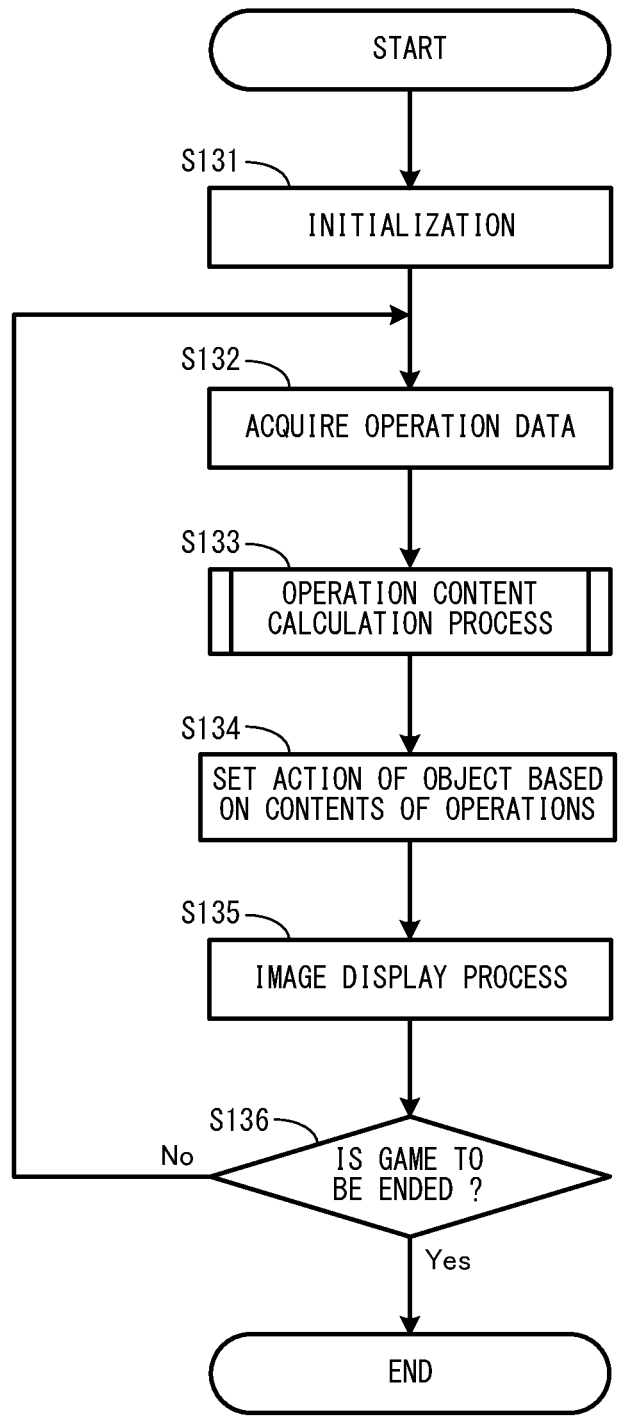
FIG. 25 is a flow chart showing a non-limiting example of information processing executed by the main body apparatus 2.
Figure 26:
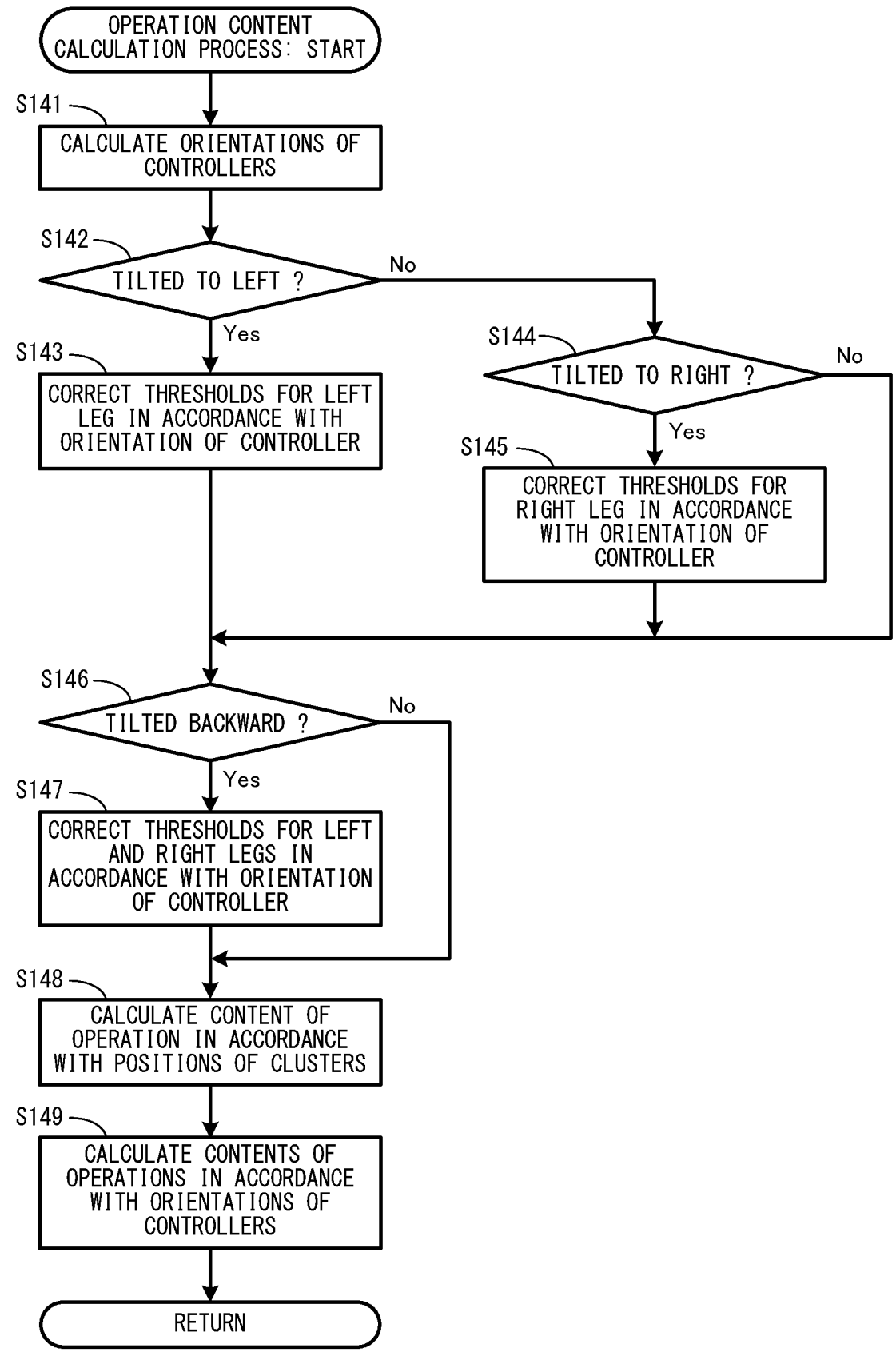
FIG. 26 is a subroutine showing a non-limiting example of detailed processing of an operation content calculation process in step S133 in FIG. 25.

Next, with reference to FIGS. 24 to 26, a description is given of an example of specific processing executed by the main body apparatus 2 according to the exemplary embodiment. FIG. 24 is a diagram showing an example of a data area set in the DRAM 85 of the main body apparatus 2 according to the exemplary embodiment. It should be noted that in the DRAM 85, in addition to data shown in FIG. 24, data used for other processes is also stored, but is not described in detail here. Further, in information processing executed by the main body apparatus 2 described later, an example is used where the information of the image capturing target members calculated in the first mode (the clustering mode) is acquired.

In a program storage area of the DRAM 85, various programs Pa, which are executed by the main body apparatus 2, are stored. In the exemplary embodiment, as the various programs Pa, a communication program for wirelessly communicating with the left controller 3 and/or the right controller 4, an application program for performing information processing (e.g., game processing) based on data acquired from the left controller 3 and/or the right controller 4, and the like are stored. It should be noted that the various programs Pa may be stored in advance in the flash memory 84, or may be acquired from a storage medium attachable to and detachable from the main body apparatus 2 (e.g., a storage medium attached to the slot 23) and stored in the DRAM 85, or may be acquired from another apparatus via a network such as the Internet and stored in the DRAM 85. The processor 81 executes the various programs Pa stored in the DRAM 85.

Further, in a data storage area of the DRAM 85, various data used for processes such as a communication process, information processing, and the like executed by the main body apparatus 2 is stored. In the exemplary embodiment, in the DRAM 85, operation data Da, orientation data Db, threshold data Dc, operation content data Dd, object action data De, image data Df, and the like are stored.

The operation data Da is operation data appropriately acquired from each of the left controller 3 and the right controller 4. As described above, operation data transmitted from the right controller 4 includes information regarding an input (specifically, information regarding an operation or the detection result of the sensor) from each of the input sections (specifically, each button, each analog stick, and each sensor), and information based on the image capturing result of a captured image captured by the infrared image capturing section 123. Further, operation data transmitted from the left controller 3 includes information regarding an input from each of the input sections. In the exemplary embodiment, operation data is transmitted in a predetermined cycle from each of the left controller 3 and the right controller 4 through wireless communication, and the operation data Da is appropriately updated using the received operation data. It should be noted that the update cycle of the operation data Da may be such that the operation data Da is updated every frame, which is the cycle of the processing described later executed by the main body apparatus 2, or is updated every cycle in which the above operation data is transmitted through the wireless communication. The operation data Da includes button operation data Da1, cluster data Da2, number-of-clusters data Da3, angular velocity data Da4, and acceleration data Da5. The button operation data Da1 is data indicating information regarding inputs from the buttons and the analog sticks of the left controller 3 and the right controller 4. The cluster data Da2 is data indicating information regarding each cluster calculated by the processing section 121 of the right controller 4. The number-of-clusters data Da3 is data indicating the number of clusters extracted by the processing section 121 of the right controller 4. The angular velocity data Da4 is data indicating information regarding angular velocities generated in each of the left controller 3 and the right controller 4 and detected by the angular velocity sensor 105 of the left controller 3 and the angular velocity sensor 115 of the right controller 4. For example, the angular velocity data Da4 includes data indicating angular velocities generated about the xyz axes in each of the left controller 3 and the right controller 4. The acceleration data Da5 is data indicating information regarding accelerations generated in each of the left controller 3 and the right controller 4 and detected by the acceleration sensor 104 of the left controller 3 and the acceleration sensor 114 of the right controller 4. For example, the acceleration data Da5 includes data indicating accelerations generated in the xyz axis directions in each of the left controller 3 and the right controller 4.

The orientation data Db is data indicating each of the orientations of the left controller 3 and the right controller 4 with respect to the direction of a gravitational acceleration in real space. For example, the orientation data Dc includes data indicating the direction of a gravitational acceleration acting on each of the left controller 3 and the right controller 4, data indicating xyz axis directions relative to the direction of the gravitational acceleration, and the like.

The threshold data Dc is data indicating the thresholds for determining the positions of the image capturing target members 205. For example, the threshold data Dc is data indicating each of the upper limit threshold FLH, the lower limit threshold FLL, the upper limit threshold FRH, the lower limit threshold FRL, the upper limit threshold HLH, the lower limit threshold HLL, the upper limit threshold HRH, and the lower limit threshold HRL.

The operation content data Dd is data indicating data indicating the content of an operation using the case 200 calculated based on the cluster data Da2 and the number-of-clusters data Da3, and data indicating the contents of operations using the case 200 and/or the headwear 300 calculated based on the angular velocity data Da4 and the acceleration data Da5.

The object action data De is data regarding the action of a player object placed in a virtual world. The image data Df is data for displaying images (e.g., an image of the player object, an image of another object, a background image, and the like) on the display device (e.g., the display 12 of the main body apparatus 2) when a game is performed.

Next, a description is given of a detailed example of information processing (e.g., game processing) according to the exemplary embodiment. It should be noted that FIG. 25 is a flow chart showing an example of the information processing executed by the main body apparatus 2. FIG. 26 is a subroutine showing an example of detailed processing of an operation content calculation process in step S133 in FIG. 25. In the exemplary embodiment, a series of processes shown in FIGS. 25 and 26 is performed by the processor 81 executing the communication program and a predetermined application program (e.g., a game program) included in the various programs Pa. Further, the information processing shown in FIGS. 25 and 26 is started at any timing.

It should be noted that the processes of all of the steps in the flow charts shown in FIGS. 25 and 26 are merely illustrative. Thus, the processing order of the steps may be changed, or another process may be performed in addition to (or instead of) the processes of all of the steps, so long as similar results are obtained. Further, in the exemplary embodiment, descriptions are given on the assumption that the processor 81 performs the processes of all of the steps in the flow charts. Alternatively, a processor or a dedicated circuit other than the processor 81 may perform the processes of some of the steps in the flow charts. Yet alternatively, part of the processing performed by the main body apparatus 2 may be executed by another information processing apparatus capable of communicating with the main body apparatus 2 (e.g., a server capable of communicating with the main body apparatus 2 via a network). That is, all the processes shown in FIGS. 25 and 26 may be executed by the cooperation of a plurality of information processing apparatuses including the main body apparatus 2.

In FIG. 25, the processor 81 performs initialization in the game processing (step S131), and the processing proceeds to the next step. For example, in the initialization, the processor 81 initializes parameters for performing the processing described below. Further, in the initialization, the processor 81 sets the types and identification information of the extension operation devices to which the left controller 3 and the right controller 4 are attached, where necessary. For example, the user may perform the operation of selecting the types of the extension operation devices using the main body apparatus 2, the left controller 3, or the right controller 4, thereby initializing the types of the extension operation devices. Alternatively, as another example, when the right controller 4 can perform short-range communication with a communication target provided in an extension operation device (the case 200) via the NFC communication section 122, the type and identification information of the extension operation device may be acquired from the communication target, thereby initializing the type and identification information of the extension operation device. Yet alternatively, when the above reference marker is captured in a captured image captured by the infrared image capturing section 123, the type of an extension operation device specified based on the image capturing shape of the reference marker, or the image capturing positional relationship between the reference marker and another image capturing target member may be acquired, thereby initializing the type of the extension operation device. Further, in the initialization, the processor 81 may initialize, in a captured image captured by the infrared image capturing section 123, the range (an analysis window) to be analyzed for calculating information based on an image capturing result, and indicate the setting content of the initialization to the right controller 4.

Next, the processor 81 acquires operation data from each of the left controller 3 and the right controller 4 and updates the operation data Da (step S132), and the processing proceeds to the next step. For example, in accordance with the operation data acquired from each of the left controller 3 and the right controller 4, the processor 81 updates the button operation data Da1, the cluster data Da2, the number-of-clusters data Da3, the angular velocity data Da4, and the acceleration data Db5.

Next, the processor 81 performs an operation content calculation process (step S133), and the processing proceeds to step S134. With reference to FIG. 26, a description is given below of the operation content calculation process performed in the above step S133.

In FIG. 26, the processor 81 calculates the orientations of the left controller 3 and the right controller 4 (step S141), and the processing proceeds to the next step. For example, the processor 81 acquires data indicating accelerations generated in the left controller 3 from the acceleration data Da5, calculates the direction of a gravitational acceleration acting on the left controller 3, and updates the orientation data Dc using data indicating the direction. Further, the processor 81 acquires data indicating accelerations generated in the right controller 4 from the acceleration data Da5, calculates the direction of a gravitational acceleration acting on the right controller 4, and updates the orientation data Dc using data indicating the direction. As a method for extracting a gravitational acceleration, any method may be used. For example, an acceleration component generated on average in the left controller 3 or the right controller 4 may be calculated and extracted as a gravitational acceleration. Then, the processor 81 acquires data indicating angular velocities generated in the left controller 3 from the angular velocity data Da4, calculates angular velocities about the xyz axes of the left controller 3, and calculates the xyz axis directions with respect to the direction of the gravitational acceleration using data indicating the angular velocities, thereby updating the orientation data Dc of the left controller 3. Further, the processor 81 acquires data indicating angular velocities generated in the right controller 4 from the angular velocity data Da4, calculates the angular velocities about the xyz axes of the right controller 4, and calculates the xyz axis directions of the right controller 4 with respect to the direction of the gravitational acceleration using data indicating the angular velocities, thereby updating the orientation data Dc.

It should be noted that after the xyz axis directions with respect to the gravitational acceleration are calculated, each of the orientations of the left controller 3 and the right controller 4 may be updated in accordance with only the angular velocities about the xyz axes. However, to prevent the relationship between the orientations of the left controller 3 and the right controller 4 and the direction of the gravitational acceleration from shifting due to erroneous accumulation, the xyz axis directions relative to the direction of the gravitational acceleration may be calculated every predetermined cycle, and each of the orientations of the left controller 3 and the right controller 4 may be corrected.

Next, the processor 81 determines whether or not the orientation of the right controller 4 indicates that the user wearing the case 200 is tilted to the left (step S142). When the orientation of the right controller 4 indicates that the user is tilted to the left, the processing proceeds to the next step S143. On the other hand, when the orientation of the right controller 4 does not indicate that the user is tilted to the left, the processing proceeds to the next step S144. For example, with reference to the orientation data Dc, the processor 81 acquires the orientation of the right controller 4. Then, as shown in FIG. 10, when the right controller 4 is inserted into the opening portion of the case 200 and fixed such that the negative y-axis direction of the right controller 4 is the forward direction of the case 200 in the state where the upper surface (the negative z-axis direction) of the right controller 4 is directed upward, and when a positive x-axis direction of the right controller 4 shown in FIG. 5 is directed above the horizontality of real space, the determination is affirmative in the above step S142.

In step S143, in accordance with the orientation of the right controller 4, the processor 81 corrects the upper limit threshold FLH and the lower limit threshold FLL for the left leg, and the processing proceeds to step S146. For example, using the angular difference between the positive x-axis direction of the right controller 4 and the horizontal direction (i.e., the inclination angle at which the user is tilted to the left) indicated by the orientation data Dc, and the correction function described with reference to FIG. 21, the processor 81 corrects the upper limit threshold FLH and the lower limit threshold FLL for the left leg and updates the threshold data Dc using the corrected upper limit threshold FLH and lower limit threshold FLL. It should be noted that when the angular difference between the positive x-axis direction of the right controller 4 and the horizontal direction changes in the direction in which the angular difference becomes small, the processor 81 multiplies the amounts of change in the upper limit threshold FLH and the lower limit threshold FLL due to the correction by a predetermined correction coefficient (a coefficient, e.g., 0.08, less than or equal to 1) and corrects the upper limit threshold FLH and the lower limit threshold FLL using the amounts of change obtained by the multiplication.

In step S144, the processor 81 determines whether or not the orientation of the right controller 4 indicates that the user wearing the case 200 is tilted to the right. Then, when the orientation of the right controller 4 indicates that the user is tilted to the right, the processing proceeds to the next step S145. On the other hand, when the orientation of the right controller 4 does not indicate that the user is tilted to the right, the processing proceeds to the next step S146. For example, with reference to the orientation data Dc, the processor 81 acquires the orientation of the right controller 4. Then, as shown in FIG. 10, when the right controller 4 is inserted into the opening portion of the case 200 and fixed such that the negative y-axis direction of the right controller 4 is the forward direction of the case 200 in the state where the upper surface (the negative z-axis direction) of the right controller 4 is directed upward, and when the positive x-axis direction of the right controller 4 shown in FIG. 5 is directed below the horizontality of real space, the determination is affirmative in the above step S144.

In step S145, in accordance with the orientation of the right controller 4, the processor 81 corrects the upper limit threshold FRH and the lower limit threshold FRL for the right leg, and the processing proceeds to step S146. For example, using the angular difference between the positive x-axis direction of the right controller 4 and the horizontal direction (i.e., the inclination angle at which the user is tilted to the right) indicated by the orientation data Dc, and the correction function described with reference to FIG. 21, the processor 81 corrects the upper limit threshold FRH and the lower limit threshold FRL for the right leg and updates the threshold data Dc using the corrected upper limit threshold FRH and lower limit threshold FRL. It should be noted that when the angular difference between the positive x-axis direction of the right controller 4 and the horizontal direction changes in the direction in which the angular difference becomes small, the processor 81 multiplies the amounts of change in the upper limit threshold FRH and the lower limit threshold FRL due to the correction by a predetermined correction coefficient (a coefficient, e.g., 0.08, less than or equal to 1) and corrects the upper limit threshold FRH and the lower limit threshold FRL using the amounts of change obtained by the multiplication.

In step S146, the processor 81 determines whether or not the orientation of the right controller 4 indicates that the user wearing the case 200 is tilted backward. Then, when the orientation of the right controller 4 indicates that the user is tilted backward, the processing proceeds to the next step S147. On the other hand, when the orientation of the right controller 4 does not indicate that the user is tilted backward, the processing proceeds to the next step S148. For example, with reference to the orientation data Dc, the processor 81 acquires the orientation of the right controller 4. Then, as shown in FIG. 10, when the right controller 4 is inserted into the opening portion of the case 200 and fixed such that the negative y-axis direction of the right controller 4 is the forward direction of the case 200 in the state where the upper surface (the negative z-axis direction) of the right controller 4 is directed upward, and when the positive y-axis direction of the right controller 4 shown in FIG. 5 is directed below the horizontality of real space, the determination is affirmative in the above step S146.

In step S147, in accordance with the orientation of the right controller 4, the processor 81 corrects the upper limit threshold FLH and the lower limit threshold FLL for the left leg and the upper limit threshold FRH and the lower limit threshold FRL for the right leg, and the processing proceeds to step S148. For example, using the angular difference between the positive y-axis direction of the right controller 4 and the horizontal direction (i.e., the inclination angle at which the user is tilted backward) indicated by the orientation data Dc, and the correction function described with reference to FIG. 22, the processor 81 corrects the upper limit threshold FLH and the lower limit threshold FLL for the left leg and the upper limit threshold FRH and the lower limit threshold FRL for the right leg and updates the threshold data Dc using the corrected upper limit threshold FLH and lower limit threshold FLL and the corrected upper limit threshold FRH and lower limit threshold FRL. It should be noted that when the angular difference between the positive y-axis direction of the right controller 4 and the horizontal direction changes in the direction in which the angular difference becomes small, the processor 81 multiplies the amounts of change in the upper limit threshold FLH and the lower limit threshold FLL and the amounts of change in the upper limit threshold FRH and the lower limit threshold FRL due to the correction by a predetermined correction coefficient (a coefficient, e.g., 0.08, less than or equal to 1) and corrects the upper limit threshold FLH and the lower limit threshold FLL and the upper limit threshold FRH and the lower limit threshold FRL using the amount of change obtained by the multiplication.

It should be noted that when the threshold correction in the above step S143 or S145 and the threshold correction in the above step S147 are both performed, the largest correction amounts may be selected from both corrections, and the thresholds may be corrected. Alternatively, the smallest correction amount may be selected from both corrections, and the thresholds may be corrected. Yet alternatively, using the average value or the added value of two threshold correction amounts calculated in both corrections, the thresholds may be corrected. It should be noted that the processor 81 performing the processes of the above steps S141 to S147 corresponds to an example of a change section.

In step S148, based on the coordinates of the center of gravity of each cluster extracted from a captured image captured by the infrared image capturing section 123 and each threshold, the processor 81 calculates the content of an operation using the case 200, and the processing proceeds to the next step. For example, based on the coordinates-of-the-center-of-gravity data of each cluster and the number of clusters in the cluster data Da2 and the number-of-clusters data Da3 updated in the above step S132, and each threshold in the threshold data Dc, the processor 81 calculates the content of an operation using the case 200 and updates the operation content data Dd. For example, when the position of the image capturing target member 205 connected to the operation portion 250 attached to the left leg of the user, i.e., the position of a cluster corresponding to the image capturing target member 205 for the left leg, falls below the upper limit threshold FLH, the processor 81 determines that the user lifts the left leg. Further, when the position of the image capturing target member 205 connected to the operation portion 250 attached to the right leg of the user, i.e., the position of a cluster corresponding to the image capturing target member 205 for the right leg, falls below the upper limit threshold FRH, the processor 81 determines that the user lifts the right leg. Further, when the position of the image capturing target member 205 connected to the operation portion 260 attached to the left arm of the user, i.e., the position of a cluster corresponding to the image capturing target member 205 for the left arm, falls below the upper limit threshold HLH, the processor 81 determines that the user performs the operation of stretching the left arm. Further, when the position of the image capturing target member 205 connected to the operation portion 260 attached to the right arm of the user, i.e., the position of a cluster corresponding to the image capturing target member 205 for the right arm, falls below the upper limit threshold HRH, the processor 81 determines that the user performs the operation of stretching the right arm. Further, when both the positions of the clusters corresponding to the image capturing target member 205 for the left leg and the image capturing target member 205 for the right leg fall below the upper limit threshold FLH and the upper limit threshold FRH, the processor 81 determines that the user performs the operation of squatting. It should be noted that the processor 81 performing the process of the above step S148 corresponds to an example of a determination section and a processing section.

Next, based on the orientations of the left controller 3 and the right controller 4, the processor 81 calculates the contents of operations using the case 200 and the headwear 300 (step S149), and the processing of this subroutine ends. For example, based on the orientations of the left controller 3 and the right controller 4 in the orientation data Db updated in the above step S141, the processor 81 calculates the contents of operations using the case 200 and the headwear 300 and updates the operation content data Dd. For example, in a case where the right controller 4 is fixed to the opening portion of the case 200 such that the negative y-axis direction of the right controller 4 is the forward direction of the case 200 in the state where the upper surface (the negative z-axis direction) of the right controller 4 is directed upward, and the left controller 3 is fixed to the headwear 300 such that the upper surface (the negative z-axis direction shown in FIG. 4) of the left controller 3 is directed in the left direction of the head of the user in the state where the lower surface of the left controller 3 is directed downward, and when the positive x-axis direction of the right controller 4 is directed above the horizontality of real space, and the positive z-axis direction of the left controller 3 is directed above the horizontality of real space, the processor 81 determines that the user performs the operation of tilting their body to the left. Further, when the positive x-axis direction of the right controller 4 is directed below the horizontality of real space, and the positive z-axis direction of the left controller 3 is directed below the horizontality of real space, the processor 81 determines that the user performs the operation of tilting their body to the right. It should be noted that the processor 81 performing the process of the above step S149 corresponds to an example of the processing section.

Referring back to FIG. 25, after the operation content calculation process in the above step S133, based on the contents of the operations using the case 200 and/or the headwear 300, the processor 81 sets the action of each portion (part) of the player object PO (step S134), and the processing proceeds to the next step. For example, based on the contents of the operations calculated in the above step S133, the processor 81 sets the action of each portion of the player object PO based on motions similar to the contents of the operations of the user and updates the player object action data De using this action. As an example, when it is determined in the above step S133 that the user lifts their left leg using the case 200 and/or the headwear 300, the player object PO is also set to the action of walking by lifting its left leg in the virtual space (see FIG. 18), and the player object action data De is updated using this action. It should be noted that the height at which the player object PO lifts its leg and the velocity at which the player object PO walks may be set by changing the height and the velocity in accordance with whether the left leg lifted by the user is in a small stride state or a large stride state, or may be set by changing the height and the velocity in accordance with the value of the position FLP of the image capturing target member 205 for the left leg. As another example, when it is determined in the above step S133 that the user tilts their body to the left using the case 200 and/or the headwear 300, the player object PO is also set to the action of revolving to the left while tilting its body to the left in the virtual space (see FIG. 23), and the player object action data De is updated using this action. It should be noted that the angle at which the player object PO tilts its body to the left and the velocity at which the player object PO revolves may be set in accordance with both (e.g., the average value, the added value, and the difference value) of the tilt of the case 200 estimated based on the orientation of the right controller 4 and the tilt of the headwear 300 estimated based on the orientation of the left controller 3, or may be set in accordance with either one of the tilts. It should be noted that the processor 81 performing the process of the above step S134 corresponds to an example of the processing section.

Next, the processor 81 performs the process of displaying on the display device an image of the virtual space in which the player object PO is placed (step S135), and the processing proceeds to the next step. For example, based on the player object action data De, the processor 81 changes the orientation or the position of the player object PO, and based on the changed orientation or position, places the player object PO in the virtual space. Then, the processor 81 performs the process of generating a virtual space image obtained by viewing the virtual space in which the player object PO is placed from a virtual camera placed at a predetermined position (e.g., a viewpoint behind the player object PO or a first-person viewpoint of the player object PO), and of displaying the virtual space image on the display device (e.g., the display 12 of the main body apparatus 2). It should be noted that the processor 81 performing the process of the above step S135 corresponds to an example of a game image generation section.

Next, the processor 81 determines whether or not the game is to be ended (step S136). In the above step S136, examples of a condition for ending the game include: the fact that a condition for ending the game is satisfied; and the fact that the user performs the operation of ending the game. When the game is not to be ended, the processing returns to the above step S132, and the process of step S132 is repeated. When the game is to be ended, the processing of the flow chart ends. Hereinafter, the series of processes of steps S132 to S136 are repeatedly executed until it is determined in step S136 that the game is to be ended.

As described above, in the exemplary embodiment, the content of an operation on the case 200 included in the extension operation devices is detected based on a captured image captured by the infrared image capturing section 123. Then, when the user wearing the case 200 and the headwear 300 tilts their body to the left, to the right, or backward, thresholds are corrected so as to prevent an erroneous determination that the leg is lifted. Thus, the detection results of the inertial sensors of the right controller 4 and/or the inertial sensors of the left controller 3 are analyzed, whereby it is possible to accurately perform the process in which the user controls the action of the player object PO in accordance with the tilt of the body of the user.

It should be noted that in the above exemplary embodiment, the thresholds for determining the positions of detection target portion images are changed based on the orientation of the right controller 4. Alternatively, the thresholds for determining the positions of detection target portion images may be changed based on the orientation of the left controller 3. For example, when the head of the user wearing the headwear 300 to which the left controller 3 is fixed tilts to the left, the thresholds for the left leg may be changed. When the head of the user tilts to the right, the thresholds for the right leg may be changed. When the head of the user tilts backward, the thresholds for the left leg and the right leg may be changed. Thus, effects similar to those of the control using the orientation of the right controller 4 may be expected.

Further, the thresholds for determining the positions of detection target portion images may be changed based on both the orientation of the left controller 3 and the orientation of the right controller 4. In this case, it is possible that the thresholds for determining the positions of detection target portion images are changed based on the average value of the orientation of the left controller 3 and the orientation of the right controller 4, the added value of the orientation of the left controller 3 and the orientation of the right controller 4, the difference value between the orientation of the left controller 3 and the orientation of the right controller 4, the greater value of the inclination angles of the orientation of the left controller 3 and the orientation of the right controller 4, the smaller value of the inclination angles of the orientation of the left controller 3 and the orientation of the right controller 4, or the like.

Further, in the above exemplary embodiment, the extension operation devices composed of the case 200 and the headwear 300 are used. Alternatively, the extension operation devices may be configured by further adding another operation device, or an extension operation device may be composed only of either one (e.g., the case 200) of the case 200 and the headwear 300. For example, when an extension operation device is composed only of the case 200, the left controller 3 becomes unnecessary. Thus, the content of an operation using the tilt of the body of the user may be determined based only on the orientation of the right controller 4.

Further, in the above exemplary embodiment, an operation portion 250 or an operation portion 260 is provided at one end of each string member 204. Alternatively, a form may be employed in which an operation portion 250 or an operation portion 260 is not provided at one end of each string member 204. For example, the user may perform an operation by gripping one end of the string member 204 with their hand, or may perform an operation with one end of the string member 204 tied to their leg, thereby performing an operation by carrying the case 200 on their back. In this case, the string member 204 itself functions as an operation section that moves in conjunction with the image capturing target member 205 in accordance with a user operation.

Further, in the above exemplary embodiment, data based on a captured image transmitted from the right controller 4 to the main body apparatus 2 may be data indicating a captured image itself captured by the infrared image capturing section 123. In this case, although it is possible that the amount of data transmitted from the right controller 4 to the main body apparatus 2 increases, various analysis processes regarding the captured image can be performed on the main body apparatus 2 side.

Further, in the above extension operation devices, the image capturing target members 205 provided in the case 200 move in the up-down direction in accordance with a user operation, and the content of an operation using the case 200 is calculated based on the positions of the image capturing target members 205. Alternatively, the image capturing target members may move in another direction in accordance with a user operation on the case 200. As a first example, in accordance with a user operation, the image capturing target members move in the left-right direction or the front-back direction, and based on the positions of the image capturing targets, the content of an operation on the extension operation devices may be calculated. As a second example, when the image capturing target members rotate about rotation axes provided parallel to the image capturing direction of the infrared image capturing section 123, markers capable of indicating predetermined directions are stuck to the surfaces of the image capturing target members on the infrared image capturing section 123 side. Then, the directions indicated by the markers are detected in a captured image captured by the infrared image capturing section 123, whereby it is possible to calculate the rotation angles at which the image capturing target members rotate. Then, based on the rotation angles, it is possible to calculate the content of an operation on the extension operation devices. In this case, it is possible that the thresholds for determining the rotation angles are changed based on data output from the inertial sensors. As a third example, when the image capturing target members rotate about rotation axes provided perpendicular to the image capturing direction of the infrared image capturing section 123, it is possible that the shapes of detection target portions to be captured are changed in accordance with a user operation. For example, markers different in the length at a position opposed to the infrared image capturing section 123 or in the shape of a pattern or the like depending on the rotation angle are stuck to the side surfaces of the image capturing target members. Then, the lengths or the shapes of the patterns or the like of the markers are detected in a captured image captured by the infrared image capturing section 123, whereby it is possible to calculate the rotation angles at which the image capturing target members rotate. Then, based on the rotation angles, it is possible to calculate the content of an operation on the extension operation devices. In this case, it is possible that the thresholds for determining the rotation angles are changed based on data output from the inertial sensors.

It should be noted that when the shapes of detection target portions to be captured are changed, as a first example, it is possible that the detection target portions (e.g., markers) change to completely different shapes such as "○", "×", or "Δ". Further, as a second example, it is possible that a part of one of the detection target portions (e.g., markers) is placed at the position where the part can be captured by the infrared image capturing section 123, and the state where a first portion as the part of the detection target portion is captured changes to the state where a second portion as another portion of the detection target portion having a shape different from that of the first portion is captured. It should be noted that the example where the shapes of the detection target portions to be captured are changed corresponds to an example where the detection target portion changes to a different image capturing shape in conjunction with an operation on the operation section.

Further, in the above exemplary embodiment, the method for detecting the motion and the orientation of the left controller 3 and the motion and the orientation of the right controller 4 is merely illustrative, and the motion and the orientation of the left controller 3 and the motion and the orientation of the right controller 4 may be detected using another method or other data. For example, the orientation of the left controller 3 and the orientation of the right controller 4 are calculated based only on angular velocities generated in each of the left controller 3 and the right controller 4, or calculated by combining angular velocities and accelerations generated in each of the left controller 3 and the right controller 4. Alternatively, the orientations may be calculated based only on accelerations generated in each of the left controller 3 and the right controller 4. Even when accelerations generated in each of the left controller 3 and the right controller 4 are detected, it is possible to calculate the direction in which a gravitational acceleration is generated in each of the left controller 3 and the right controller 4. It goes without saying that it is possible to perform processing similar to that described above in the exemplary embodiment by sequentially calculating the xyz axis directions with respect to the gravitational acceleration.

Further, each of the main body apparatus 2, the left controller 3, and the right controller 4 may be any apparatus, and may be a mobile game apparatus, any mobile electronic device (a PDA (Personal Digital Assistant), a mobile phone, a personal computer, a camera, a tablet, or the like) or the like.

Further, the above descriptions have been given using an example where the main body apparatus 2 performs information processing (game processing) and a communication process. Alternatively, another apparatus may perform at least some of the processing steps. For example, if the main body apparatus 2 is further configured to communicate with another apparatus (e.g., another server, another image display device, another game apparatus, or another mobile terminal), the other apparatus may move in conjunction with to perform the processing steps. Another apparatus may thus perform at least some of the processing steps, thereby enabling processing similar to that described above. Further, the above information processing (game processing) can be performed by a processor or the cooperation of a plurality of processors, the processor or the plurality of processors included in an information processing system including at least one information processing apparatus. Further, in the above exemplary embodiment, information processing can be performed by the processor 81 of the main body apparatus 2 executing a predetermined program. Alternatively, part or all of the processing of the flow charts may be performed by a dedicated circuit included in the main body apparatus 2.

Here, according to the above variations, it is possible to achieve the exemplary embodiment also by a system form such as cloud computing, or a system form such as a distributed wide area network or a local area network. For example, in a system form such as a distributed local area network, it is possible to execute the processing between a stationary information processing apparatus (a stationary game apparatus) and a mobile information processing apparatus (a mobile game apparatus) by the cooperation of the apparatuses. It should be noted that, in these system forms, there is no particular limitation on which apparatus performs the above processing. Thus, it goes without saying that it is possible to achieve the exemplary embodiment by sharing the processing in any manner.

Further, the processing orders, the setting values, the conditions used in the determinations, and the like that are used in the information processing described above are merely illustrative. Thus, it goes without saying that the exemplary embodiment can be achieved also with other orders, other values, and other conditions.

Further, the above program may be supplied to the main body apparatus 2 or the right controller 4 not only through an external storage medium such as an external memory, but also through a wired or wireless communication link. Further, the program may be stored in advance in a non-volatile storage device included in the apparatus. It should be noted that examples of an information storage medium having stored therein the program may include CD-ROMs, DVDs, optical disk storage media similar to these, flexible disks, hard disks, magneto-optical disks, and magnetic tapes, as well as non-volatile memories. Alternatively, an information storage medium having stored therein the program may be a volatile memory for storing the program. It can be said that such a storage medium is a storage medium readable by a computer or the like. For example, it is possible to provide the various functions described above by causing a computer or the like to load a program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. When used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment can be used as an information processing system, an information processing program, an information processing method, an information processing apparatus, and the like that are capable of achieving a greater variety of user operations.

What is claimed is:

1. An information processing system comprising:
    a device comprising:
       an inertial sensor;
       an image capturing device;
       a detection target portion configured to be captured by the image capturing device; and
       an operation portion configured to be operated by a user and cause the detection target portion to move in conjunction with the operation portion in accordance with the operation; and
    at least one computer configured to:
       detect a detection target portion image representing the detection target portion comprised in a captured image captured by the image capturing device;
       specify at least one of a position and a shape of the detection target portion image in the captured image;
       based on the at least one of the position and the shape of the detection target portion image in the captured image, determine whether or not a condition for performing a first process is satisfied; and
       change the condition based on data output from the inertial sensor,
    wherein as an orientation of the device changes, orientations of the inertial sensor, image capturing device, and detection target portion change in association with the orientation of the device.

2. The information processing system according to claim 1, wherein
    the detection target portion moves along a movement path in accordance with the operation, and
    when the detection target portion image in the captured image is located in at least one of a predetermined position and a predetermined range based on the movement path, the condition for performing the first process is determined as being satisfied.

3. The information processing system according to claim 2, wherein
    the at least one of the predetermined position and the predetermined range is changed based on the data output from the inertial sensor, thereby changing the condition.

4. The information processing system according to claim 3, wherein
    the at least one of the predetermined position and the predetermined range is changed based on the movement path, thereby changing the condition.

5. The information processing system according to claim 4, wherein
    in a moving direction of the detection target portion image in the captured image when the detection target portion moves along the movement path in accordance with an operation of the user, the at least one of the predetermined position and the predetermined range is moved based on the data output from the inertial sensor, thereby changing the condition.

6. The information processing system according to claim 5, wherein
    the movement of the at least one of the predetermined position and the predetermined range in the moving direction is limited to within a certain limit value, thereby changing the condition.

7. The information processing system according to claim 1, wherein
    an orientation of the user operating the device is estimated based on the data output from the inertial sensor, and when the orientation is a predetermined orientation, the condition is changed.

8. The information processing system according to claim 1, wherein the computer is further configured to:
    generate a game image comprising a game object; and
    in performing the first process, control, based on the at least one of the position and the shape of the detection target portion image, at least one of an orientation and an action of the game object.

9. The information processing system according to claim 1, wherein
    the first process is performed based on the at least one of the position and the shape of the detection target portion image, and a second process different from the first process is performed based on the data output from the inertial sensor.

10. The information processing system according to claim 9, wherein
    a process of controlling at least one of an orientation and an action of a game object based on the data output from the inertial sensor is performed as the second process.

11. The information processing system according to claim 1, wherein the device further comprises:
    a connection portion configured to connect the operation portion and the detection target portion to cause the detection target portion to move in conjunction with a motion of the operation portion.

12. The information processing system according to claim 1, wherein
    the detection target portion changes to a different image capturing shape in conjunction with an operation on the operation portion, and
    when the detection target portion image is specified as a predetermined shape, the first process is determined to be performed.

13. The information processing system according to claim 1, wherein
    when the data output from the inertial sensor indicates a predetermined orientation or a predetermined motion of the device, the condition is not changed.

14. The information processing system according to claim 1, wherein
    based on the at least one of the position and the shape of the detection target portion image, a game is advanced by controlling a game object, and
    based on the data output from the inertial sensor, the condition is repeatedly changed during the game.

15. The information processing system according to claim 1, wherein the image capturing device is detachably fixed to the device.

16. A non-transitory computer-readable storage medium having stored therein an information processing program executed by a computer of an information processing apparatus for performing processing based on an operation using a device comprising an inertial sensor, an image capturing device, a detection target portion configured to be captured by the image capturing device, and an operation portion configured to cause the detection target portion to move in conjunction with the operation portion in accordance with a user operation, the information processing program causing the computer to provide execution comprising:

based on at least one of a position and a shape of a detection target portion image representing the detection target portion comprised in a captured image captured by the image capturing device, determining whether or not a condition for performing a first process is satisfied; and changing the condition based on data output from the inertial sensor, wherein as an orientation of the device changes, orientations of the inertial sensor, image capturing device, and detection target portion change in association with the orientation of the device.

17. An information processing method for performing processing based on an operation using a device comprising an inertial sensor, an image capturing device, a detection target portion configured to be captured by the image capturing device, and an operation portion configured to cause the detection target portion to move in conjunction with the operation portion in accordance with a user operation, the information processing method comprising:

based on at least one of a position and a shape of a detection target portion image representing the detection target portion comprised in a captured image captured by the image capturing device, determining whether or not a condition for performing a first process is satisfied; and changing the condition based on data output from the inertial sensor, wherein as an orientation of the device changes, orientations of the inertial sensor, image capturing device, and detection target portion change in association with the orientation of the device.

18. An information processing apparatus for performing processing based on an operation using a device comprising an inertial sensor, an image capturing device, a detection target portion configured to be captured by the image capturing device, and an operation portion configured to cause the detection target portion to move in conjunction with the operation portion in accordance with a user operation, the information processing apparatus comprising:

a processor; and a memory configured to store computer readable instructions that, when executed by the processor, cause the information processing apparatus to:

based on at least one of a position and a shape of a detection target portion image representing the detection target portion comprised in a captured image captured by the image capturing device, determine whether or not a condition for performing the first process is satisfied; and change the condition based on data output from the inertial sensor, wherein as an orientation of the device changes, orientations of the inertial sensor, image capturing device, and detection target portion change in association with the orientation of the device.

19. The information processing system of claim 1, wherein the inertial sensor, the image capturing device, and the detection target portion are housed within the device.

20. The information processing system of claim 1, wherein the orientation of the inertial sensor, the image capturing device, and the detection target portion changes as the user carries and operates the device.

\* \* \* \* \*